United States Patent
Wilson et al.

(10) Patent No.: US 10,540,301 B2
(45) Date of Patent: Jan. 21, 2020

(54) VIRTUAL HOST CONTROLLER FOR A DATA PROCESSING SYSTEM

(71) Applicant: Apple Inc., Cupertino, CA (US)

(72) Inventors: Daniel B. Wilson, San Francisco, CA (US); Scott M. Deandrea, San Jose, CA (US); Roberto G. Yepez, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 6 days.

(21) Appl. No.: 15/721,871

(22) Filed: Sep. 30, 2017

(65) Prior Publication Data
US 2018/0349297 A1 Dec. 6, 2018

Related U.S. Application Data

(60) Provisional application No. 62/514,695, filed on Jun. 2, 2017.

(51) Int. Cl.
| | |
|---|---|
| *G06F 13/10* | (2006.01) |
| *G06F 13/42* | (2006.01) |
| *G06F 13/38* | (2006.01) |
| *G06F 9/50* | (2006.01) |

(52) U.S. Cl.
CPC .......... *G06F 13/107* (2013.01); *G06F 9/5077* (2013.01); *G06F 13/387* (2013.01); *G06F 13/4221* (2013.01)

(58) Field of Classification Search
CPC .. G06F 13/107; G06F 13/4221; G06F 13/387; G06F 9/5077
See application file for complete search history.

(56) References Cited

U.S. PATENT DOCUMENTS

| | | | | |
|---|---|---|---|---|
| 2009/0271557 A1* | 10/2009 | Hsu | ...................... | G06F 13/4027 710/315 |
| 2010/0180050 A1* | 7/2010 | Hsiao | .................... | G06F 13/102 710/5 |
| 2013/0072260 A1* | 3/2013 | Nair | ...................... | G06F 13/102 455/566 |
| 2013/0132960 A1* | 5/2013 | de Goede | ................. | G06F 9/46 718/101 |
| 2013/0262708 A1* | 10/2013 | McLeod | ............. | G06F 13/4252 710/2 |
| 2013/0297718 A1* | 11/2013 | Singh | .................... | G06F 3/0673 709/213 |
| 2014/0164648 A1* | 6/2014 | Barber | .................. | G06F 13/122 710/8 |
| 2014/0229764 A1* | 8/2014 | Emerson | ............. | G06F 11/3024 714/13 |
| 2018/0239728 A1* | 8/2018 | Emerson | ............... | G06F 13/385 |
| 2018/0335954 A1* | 11/2018 | Ramaswamy | ........ | G06F 3/0611 |

* cited by examiner

*Primary Examiner* — Henry Tsai
*Assistant Examiner* — Christopher Daley
(74) *Attorney, Agent, or Firm* — Jaffery Watson Mendonsa & Hamilton LLP

(57) ABSTRACT

One embodiment provides an apparatus comprising a first processor to execute a function driver for a peripheral having a first bus interface and virtualized host controller interface logic to provide a protocol interface associated with the first bus interface to the function driver to enable the function driver to control a set of peripherals connected via at least a second bus interface, the second bus interface different from the first bus interface.

20 Claims, 13 Drawing Sheets

US 10,540,301 B2

VIRTUAL HOST CONTROLLER FOR A DATA PROCESSING SYSTEM

CROSS-REFERENCE

This application claims priority to U.S. Provisional Patent Application No. 62/514,695 filed Jun. 2, 2017, which is hereby incorporated herein by reference.

BACKGROUND OF THE DISCLOSURE

As computing devices have become more complex, overall system architecture has moved from systems in which a single computer controls less complex IO devices towards independently operating computers coordinating to perform IO. Individual IO peripherals can be controlled by a variety of transports, and in the traditional model each transport and peripheral has a function-specific driver to expose those capabilities to the system. For systems made up of multiple computers, the peripheral transport is relevant to the node that controls that specific peripheral, but all traffic between nodes must funnel through a link that is unlikely to be the same as the peripheral connection. In such systems, it may be desirable to abstract the specific transport being used and present all peripherals in a consistent manner.

SUMMARY OF THE DESCRIPTION

Embodiments described herein provide hardware and software logic to present diverse peripherals on one node of a complex system as having a common interface and communication protocol when presented to peripheral drivers connected to another node. The nodes are connected using a transport agnostic mechanism that allows communication using one of a variety of different transport mechanisms, including but not limited to PCI/PCIe or Ethernet.

One embodiment provides for an apparatus comprising a first processor to execute a function driver for a peripheral having a first bus interface; and virtualized host controller interface logic to provide a protocol interface associated with the first bus interface to the function driver to enable the function driver to control a set of peripherals connected via at least a second bus interface, the second bus interface different from the first bus interface.

One embodiment provides for a data processing system comprising a first non-transitory machine-readable medium storing first instructions; a first processor configured to execute the first instructions, the first instructions to enable a first node of a host controller interface; a second non-transitory machine-readable medium storing second instructions; a second processor configured to execute the second instructions, the second instructions to enable a second node of the host controller interface; wherein the host controller interface is to provide a universal serial bus (USB) interface for a first non-USB peripheral via the first node; wherein the host controller interface is to connect with the first non-USB peripheral via the second node; and wherein the first node and the second node are to communicate via a transport agnostic link.

One embodiment provides for a non-transitory machine readable medium storing instructions which, when executed on one or more processors cause the one or more processors to perform operations comprising enabling a first node of a virtualized host controller interface, the first node providing a first protocol interface for a set of peripherals; initiating establishment of a transport agnostic message link with a second node of the virtualized host controller interface, the second node connected with the set of peripherals via a second protocol interface; receiving a set of messages from the second node via the transport agnostic link; and translating the set of messages to the first protocol interface.

One embodiment provides for a non-transitory machine readable medium storing instructions which, when executed on one or more processors cause the one or more processors to perform operations comprising enabling a second node of a virtualized host controller interface, the second node connected with a set of peripherals via a second protocol interface; receiving initiation of a transport agnostic message link with a first node of the virtualized host controller interface, the first node to provide a first protocol interface for the set of peripherals; receiving signals from the set of peripherals via the second protocol interface; and sending translated signals from the set of peripherals over the transport agnostic message link to the first node.

Other features of the present embodiments will be apparent from the accompanying drawings and from the detailed description, which follows.

BRIEF DESCRIPTION OF THE DRAWINGS

Embodiments of the present invention are illustrated by way of example, and not limitation, in the figures of the accompanying drawings in which reference numbers are indicative of origin figure, like references may indicate similar elements, and in which.

DETAILED DESCRIPTION

Figure 1:
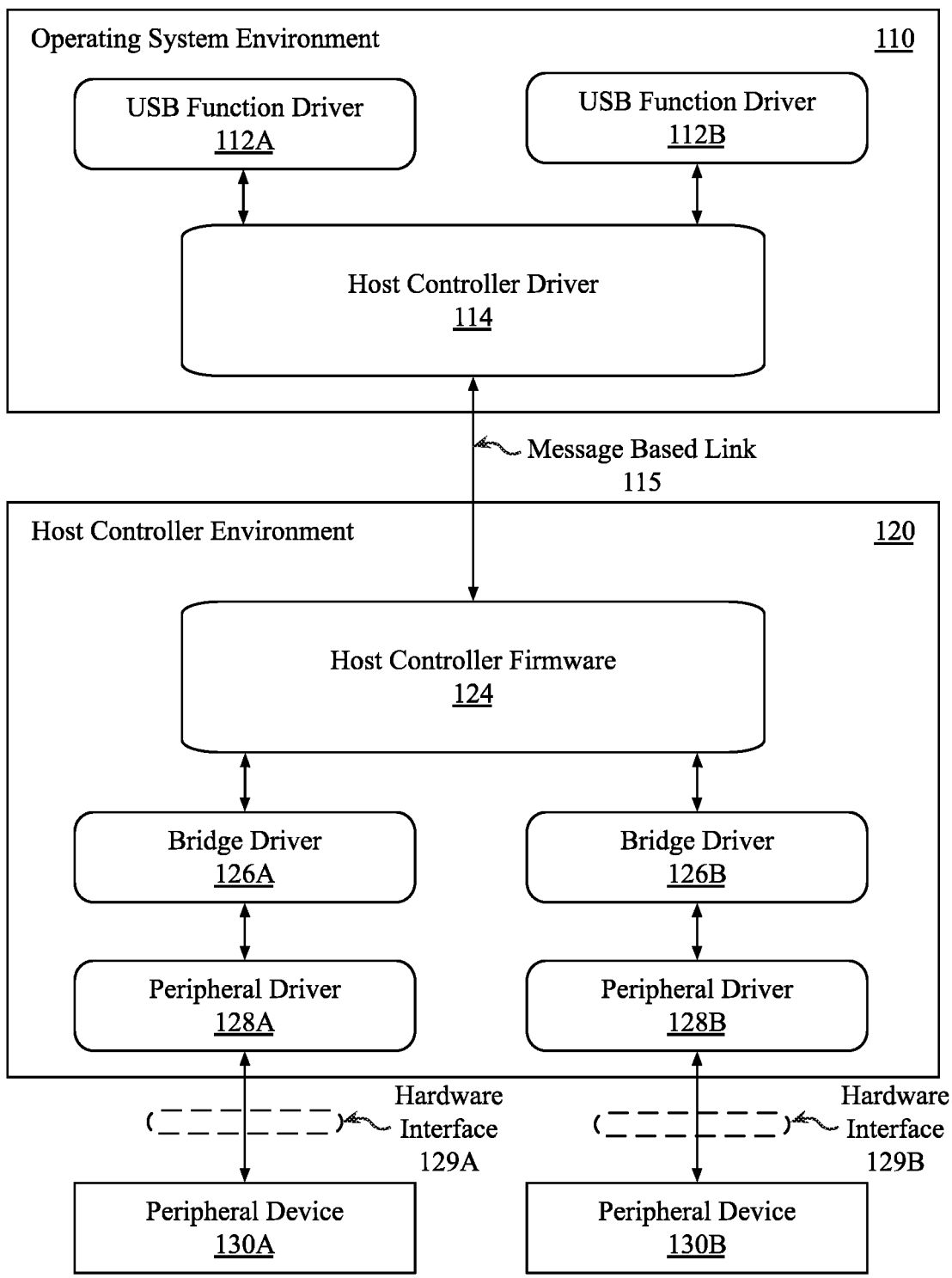
FIG. 1 illustrates an I/O system, according to an embodiment.

Universal Serial Bus (USB) is established as a transport technology that presents independently operating peripherals in a class-compliant manner. Accordingly, USB is a natural choice for exposing peripherals from one compute node to compute another. USB has clearly defined protocols and classes to support common devices such as keyboards and cameras, and most operating systems have strong support for these services. Embodiments described herein leverage the universality of the USB protocol by providing hardware and software logic to present non-USB peripherals on one node of a complex computing system as USB peripherals to another node within the computing system. In one embodiment, a variety of internal system devices including but not limited to keyboards, touchpads, cameras, storage devices, multimedia encoding devices, network devices, sensors, microphones and/or other I/O devices, including other user input devices, can be abstracted to the operating system as USB devices, which can significantly simplify the complexity of operating system level I/O device support.

While USB will be described as an exemplary endpoint protocol, embodiments are not limited to use of USB, and any suitable protocol can be used.

Reference in the specification to "one embodiment" or "an embodiment" means that a feature, structure, or characteristic described in conjunction with the embodiment can be included in at least one embodiment of the invention. The appearances of the phrase "in one embodiment" in various places in the specification do not necessarily all refer to the same embodiment.

The processes depicted in the figures that follow are performed by processing logic that comprises hardware (e.g. circuitry, dedicated logic, etc.), software (as instructions on a non-transitory machine-readable storage medium), or a combination of both hardware and software. Although the processes are described below in terms of some sequential operations, it should be appreciated that some of the operations described may be performed in a different order. Moreover, some operations may be performed in parallel rather than sequentially.

In the figures and description to follow, reference numbers are indicative of the figure in which the referenced element is introduced, such that an element having a reference number of N00 is first introduced in FIG. N. For example, an element having a reference number between 100 and 199 is first shown in FIG. 1, while an element having a reference number between 200 and 299 is first shown in FIG. 2, etc. Within a description of a given figure, previously introduced elements may or may not be referenced.

USB Overview

USB is highly flexible interface that defines a framework for identification of hot-plugged peripherals, standard commands for performing simple operations on all devices, and a variety of device and interface classes to allow a single software driver to control many independently developed pieces of hardware. USB also defines different transfer types to cover different quality of service and timing constraints. Control and bulk transfers include error correction, but make no guarantees for bandwidth. Interrupt transfers have error correction and guaranteed bandwidth, and isochronous transfers are best-effort with guaranteed bandwidth. Peripherals can contain a variety of endpoints, each defined with a specific transfer type and direction. USB's identification framework allows the peripheral to define the endpoints in almost any way, and these transfer types together define a system that can provide the range of functionality needed by the device and interface classes.

USB peripherals are controlled and managed by a USB host controller and an associated driver. The host controller is responsible for detecting port events such as connect and disconnect, and managing queues to send and receive data from peripherals. Each endpoint queue operates independently, with separate flow control and handshaking mechanisms. While an endpoint may not accept data until a buffer on the receive end is ready, a delay on one endpoint do not impede transfers on other endpoints.

Peripheral Interface Overview

Embodiments described herein enable presentation of a peripheral using any transport mechanism or interface protocol as a USB device to an operating system executing on a data processing system that implements the techniques described herein. The devices are presented via the familiar mechanism of a USB host controller to encourage code reuse. In one embodiment, a bridging driver is employed that interacts with host controller firmware that enables translation between the connection protocol of the peripheral to a host controller that can be interacted with via a USB function driver. While USB is described as the protocol presented for devices, the programmable nature of the system allows peripheral devices to be presented as other protocols by modifying the host controller and bridging driver described herein.

FIG. 1 illustrates an I/O system 100, according to an embodiment. In one embodiment the I/O (input/output) system 100 includes an operating system environment 110 and a host controller environment 120. The operating system environment 110 includes a set of USB function drivers 112A-112B in communication with a host controller driver 114. The host controller environment 120 includes host controller firmware 124, a set of bridge drivers 126A-126B, and a set of peripheral drivers 128A-128B. In one embodiment a message based link 115 enables communication between the host controller environment 120 and the operating system environment 110. The message based link 115 allows non-memory mapped transport mechanisms to be used and allows transport-agnostic communication between the host controller environment and the operating system environment 110.

In one embodiment the components of the operating system environment 110 are software modules that execute on a processor of the data processing system. The host controller driver 114 may be a kernel level driver or a user level driver of the operating system and can enable the operating system to communicate with a host controller, via the host controller firmware 124, and enable the peripheral devices 130A-130B to interact with the operating system and applications of the data processing system as USB devices. The USB function drivers 112A-112B are unaware of the implementation details of the host controller accessed via the host controller driver 114 and existing USB drivers can be used to control the peripheral devices 130A-130B.

In one embodiment, within the host controller environment 120, the set of peripheral drivers 128A-128B communicate with a set of peripheral devices 130A-130B via a set of hardware interfaces 129A-129B. The bridge drivers 126A-126B enable interface translation between the peripheral drivers 128A-128B and the host controller firmware 124. A properly implemented bridge driver for each peripheral can enable communication between any type of peripheral and the host controller firmware 124. Peripheral device 130A and peripheral device 130B can be different types of devices (e.g., keyboard and touchpad, camera and fan controller, etc.) and can communicate via different communication protocols (e.g., serial peripheral interface (SPI), general-purpose input/output (GPIO), Inter-Integrated Circuit (I2C), Universal Asynchronous Receiver/Transmitter (UART), etc.). Thus, hardware interface 129A can differ from hardware interface 129B in physical form factor and communication protocol.

Figure 2:
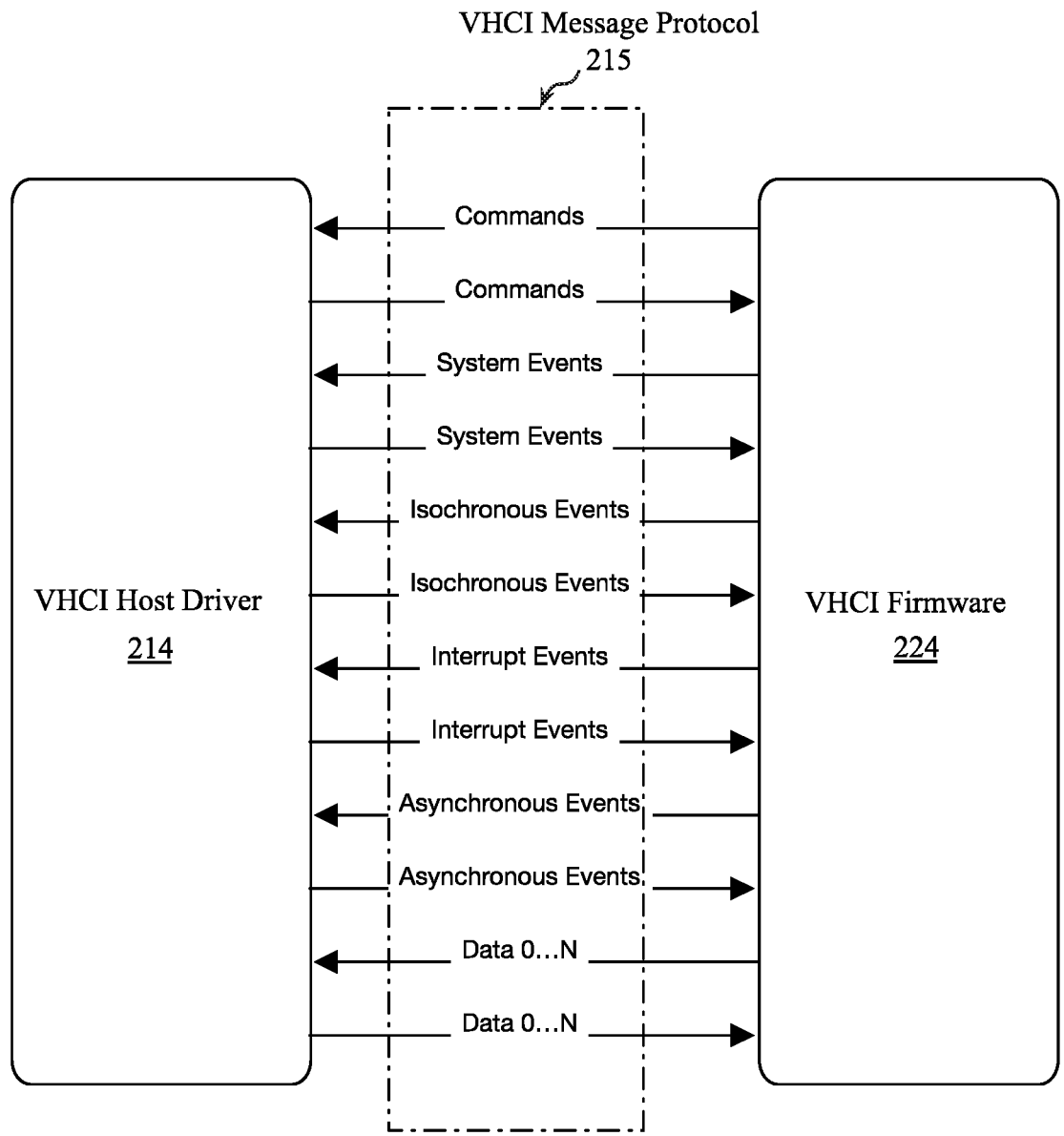
FIG. 2 illustrates a virtual host controller interface system, according to an embodiment.

FIG. 2 illustrates a virtual host controller interface system 200, according to an embodiment. In one embodiment, the host controller environment 120 of FIG. 1 is implemented within a virtual host controller, which enables a virtual host controller interface (VHCI) system 200 that abstracts the underlying protocol of connected peripherals. In one embodiment a VHCI host driver 214 executes on a data processing system and is analogous to the host controller driver 114 of FIG. 1. VHCI firmware 224 executes on the virtual host controller hardware and is analogous to host controller firmware 124 of FIG. 1. A VHCI message protocol 215 enables a message based link, such as the message based link 115 of FIG. 1. In one embodiment, the VHCI message protocol 215 can be used to enable non-memory mapped transport mechanisms to be used, allowing for transport-agnostic communication between the VHCI host driver 214 and the VHCI firmware 224. The arbitrary transport can be any transport mechanism supported by the data processing system including but not limited to peripheral controller interconnect (PCI) or Ethernet. The PCI transport, in one embodiment, is a PCI express bus. In one embodiment, the VHCI message protocol 215 may alternatively be used to connect a traditionally memory-mapped host controller, such as the eXtensible Host Controller Interface (XHCI) across an alternative transport, such as Ethernet. In such embodiment the VHCI firmware 224 would be responsible for translating commands and data transfers for the underlying controller.

Communication between the VHCI host driver 214 and VHCI firmware 224 is accomplished via unidirectional channels that carry commands, events, and data. Commands always generate a command completion message, and the completion message is sent on an event channel specified in the command definition. System events include general controller events and port change events. Isochronous, interrupt, and asynchronous events include transfer completion and endpoint-specific messages. Data transfers are performed via unidirectional channels dedicated for each instantiated USB endpoint. Most endpoints are also unidirectional, and therefore have only a single channel. In one embodiment, control endpoints are enabled which perform bidirectional communication. Such control inputs will therefore have both INPUT and OUTPUT channels.

In one embodiment, the VHCI firmware 224 is implemented as program code that executes on a virtual host controller processor. In such embodiment, the VHCI firmware 224 is configured to perform operations that are generally performed within hardware logic of a USB controller, including handling complications that can arise based on USB's dependency on packet size and transfer length within the communication protocol. For example, USB endpoints have a descriptor-defined maximum packet size. Larger USB transfers are broken into consecutive packets of the maximum packet size. A packet smaller than the maximum packet size, down to a zero-length packet, is used to signal an end to a USB data transfer. This mechanism blurs the line between the transport, which would typically be concerned with packet size, and the protocol, which would typically be concerned only with transfer length. USB function drivers are aware of the maximum packet size for the endpoint in use and can explicitly send a zero-length packet in cases where the payload is an even multiple of the maximum packet size.

Existing host controllers, such as XHCI controllers or universal host controllers (UHCI) internally process the transfer length and apply logic to determine if a transfer is complete. If a transfer completes, the hardware immediately advances to the next transfer in its queue. In one embodiment, the VHCI firmware 224 can implement similar logic to provide the operational model expected by the USB function drivers, such that the host controller firmware may wait for more data to be delivered to a given buffer, or may need to advance to the next transfer and deliver data to a different buffer, based on the size of a received payload. Alternatively, and in one embodiment, a VHCI transfer may be required to be completely finished at the software level before the next transfer can be started.

VHCI System Architecture

Figure 3A:
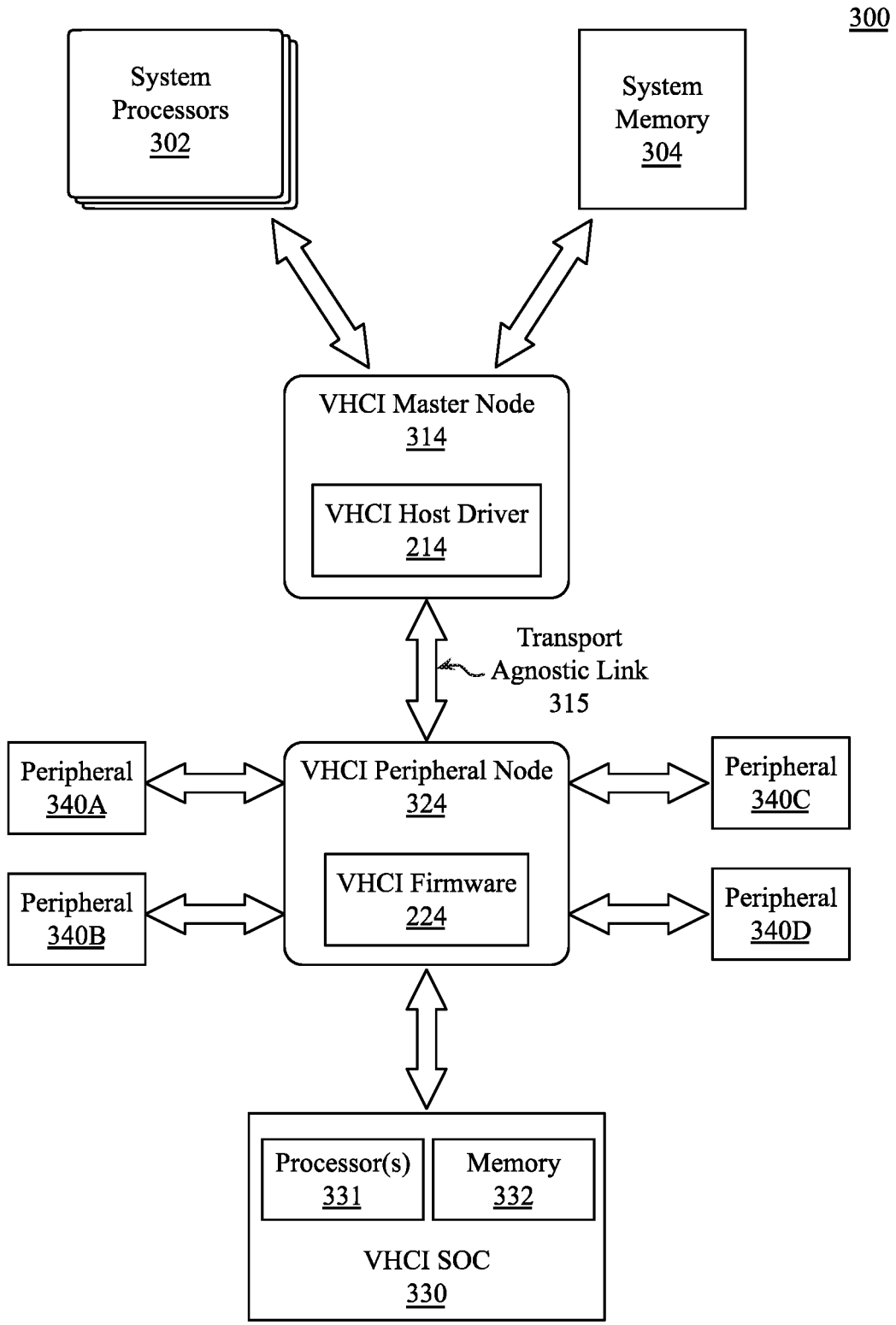
FIG. 3A-3B illustrate a virtual host controller interface system architectures according to embodiments.

FIG. 3A illustrates a VHCI system architecture 300 according to an embodiment. In one embodiment, the VHCI system architecture 300 includes a VHCI master node 314 that enables an operating system to interact with a VHCI peripheral node 324. The VHCI master node 314 can be a logical device that executes instructions via the system processors 302 based on data and instructions stored in system memory 304. The VHCI master node 314 can include the VHCI host driver 214 to facilitate communication for the system with the VHCI peripheral node 324. The VHCI peripheral node 324, in one embodiment, may also be a logical device that executes instructions of the VHCI firmware 224 via an embedded processor, such as a VHCI system on a chip integrated circuit (SOC) 330. The VHCI SOC 330 includes one or more processors 331 and memory 332, which are used to execute the VHCI firmware 224 of the VHCI peripheral node 324. A set of peripherals 340A-340D can communicate with the VHCI peripheral node 342 via a variety of interconnect mechanisms, which may be the same or similar interconnect mechanisms or may each be different interconnect mechanisms. In various embodiments, supported peripheral interconnects include but are not limited to SPI, I2C, GPIO, and UART based interconnects. The VHCI master node 314 and the VHCI peripheral node 324 connect via a transport agnostic link 315. The transport mechanism used by the transport agnostic link 315 can be any transport mechanism otherwise supported by the system or can be a special transport link used specifically to enable VHCI communication.

Figure 3B:
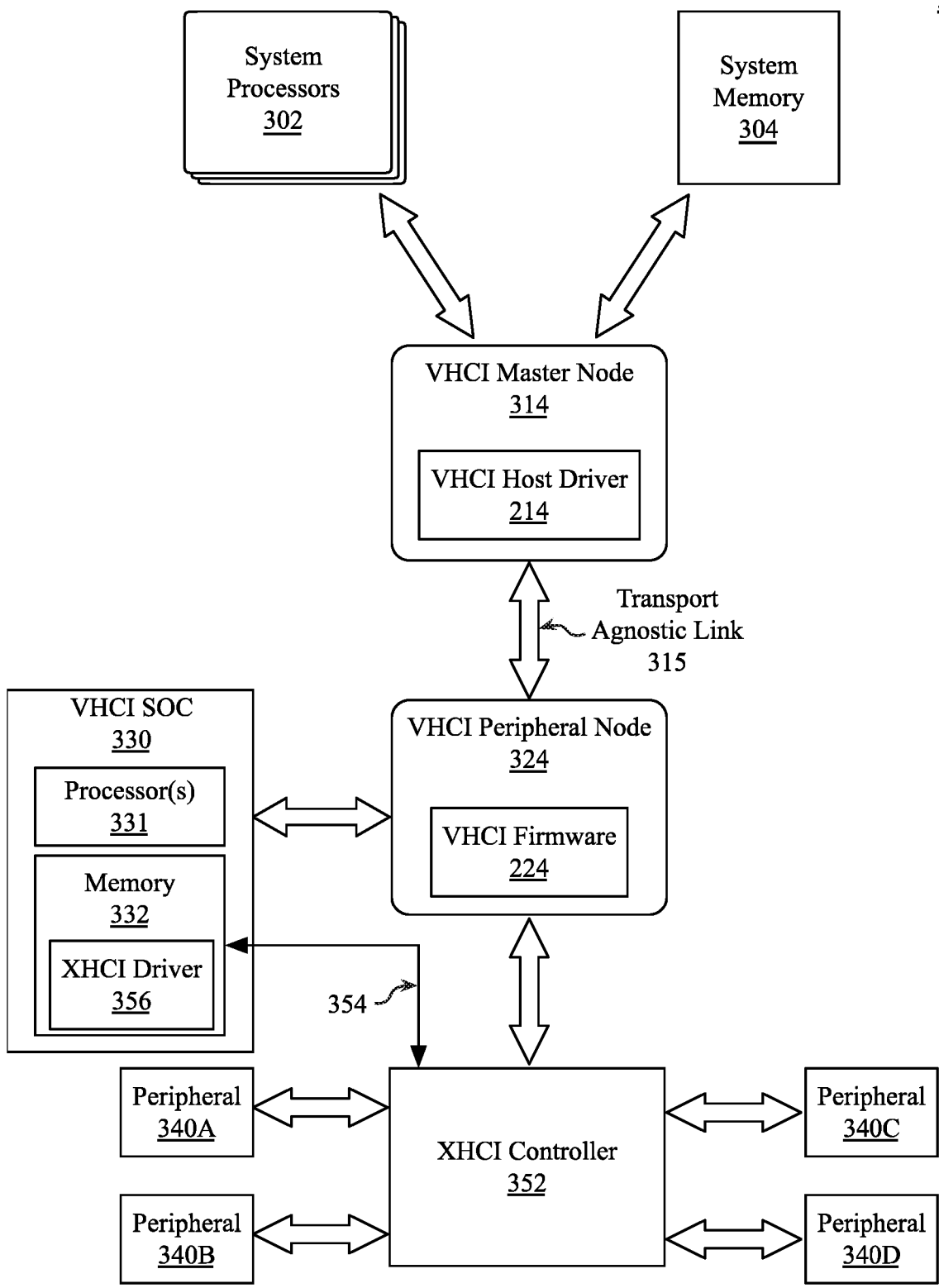

FIG. 3B illustrates a VHCI system architecture 350, according to an additional embodiment. The illustrated VHCI system architecture 350 enables a VHCI interface to a USB controller known in the art, such as, for example, an XHCI controller 352. The illustrated VHCI system architecture 350 translates an XHCI connection established with the VHCI SOC 330 into a VHCI connection. The VHCI connection can be established with a host operating system via the transport agnostic link 315. The XHCI controller 352 is a memory mapped controller having an XHCI controller memory mapping 354 to memory 332 in the VHCI SOC 330. The XHCI controller memory mapping 354 enables the XHCI controller 352 to access memory to store data buffers that are allocated and managed by an XHCI driver 356 executing in memory 332. The VHCI peripheral node 324, via the VHCI firmware 224, can then translate commands and data from the VHCI master node 314 to commands and data to be executed via the XHCI controller 352.

The VHCI SOC 330 of FIG. 3A-3B can perform various system operations beyond those required to enable a VHCI connection to peripherals on the system. In one embodiment, the VHCI SOC 330 is a complete computing system that executes a complete operating system that is separate from the main operating system that executes on the system processors 302 and via the system memory 304. In such embodiment, the operations of the VHCI SOC 330 may be performed independently from and agnostically to the host operating system. In one embodiment, the VHCI SOC 330 can have a different microarchitecture and/or instruction set architecture than the system processors 302. For example, the system processor 302 can be processors configured to execute an instruction set architecture provided by Intel Inc., such as a variant of the x86 instruction set architecture. The VHCI SOC 330 can be configured to execute a variant of an instruction set architecture provided by ARM Holdings plc.

However, the processors described herein are not limited to any specific processor architecture, microarchitecture, or instruction set architecture.

In one embodiment, the VHCI SOC 330 can additionally perform security related operations for the system. For example, access to peripherals 340A-340D connected directly to the VHCI peripheral node 324 or indirectly via an XHCI controller 352 can be gated by the VHCI SOC 330 to ensure access to those peripherals is performed in a secure manner and to prevent unauthorized access to those peripherals by malware or other malicious software that may have gained access to the system processors 302 and/or system memory 304.

VHCI Message Protocol and Controller Commands

In one embodiment, all VHCI commands, events, and messages share a common structure and include message fields that specify a type, status, selector, and data fields. In one embodiment, the common message format additionally includes an abort bit and a completion bit. The VHCI firmware 224 sets the completion bit when sending a command completion notification to the VHCI host driver 214. The VHCI host driver 214 can set the abort bit when sending a command abort to the VHCI firmware 224. The firmware will respond with a command completion and will not set the Abort Command bit in the response to the VHCI host driver 214.

Figure 4:
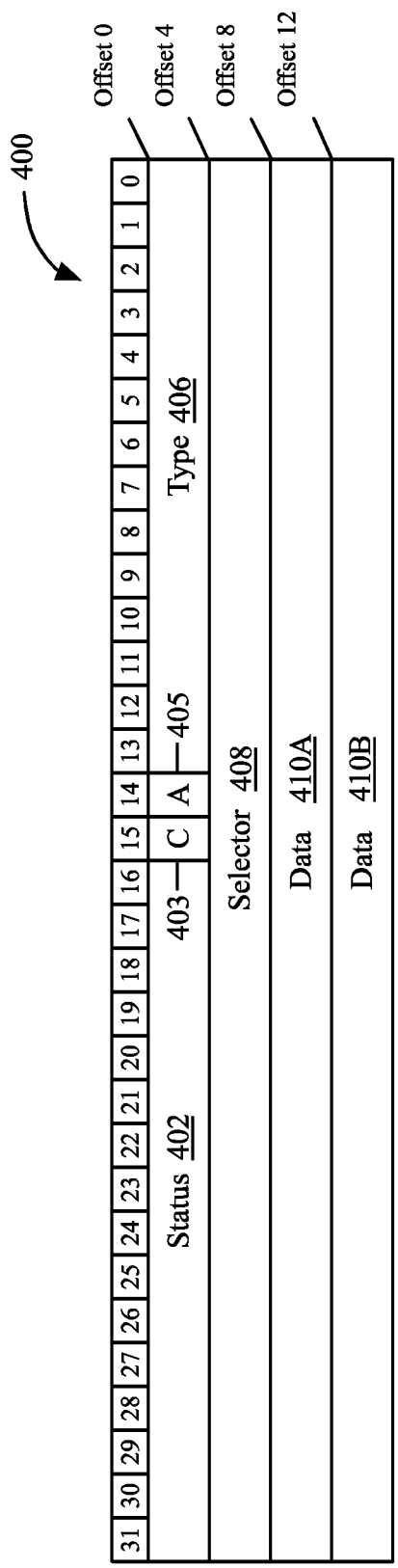
FIG. 4 illustrates an exemplary layout for virtual host controller interface commands, events, and messages.

FIG. 4 illustrates an exemplary layout 400 for VHCI commands, events, and messages. The illustrated layout 400 is exemplary of one embodiment, but not limiting as to all embodiments described herein. In the illustrated layout, a type field 406 occupied bits 0:13 from byte offset 0. The type field 406 specifies whether the transmitted data is a message, event, or command identifier. The abort command bits 405 and complete command bits 403 described above occupy bits 14 and 15 respectively. A status field 402 occupies bits 16:31 and specifies a VHCI-specific status code. A selector field 408 occupies bits 0:31 at byte offset 4. The selector field 408 can have two formats, one first format for port-centric commands, messages, and events and a second format for endpoint-centric commands, messages, and events. For port specific commands, the selector field 408 specifies a root port number for selection. For endpoint commands, the selector specifies a stream ID, endpoint address, and device address. Additionally, each message can specify 64-bits of data, with a first data field beginning at byte offset 8 and a second data field beginning at byte offset 12.

Figure 5A:
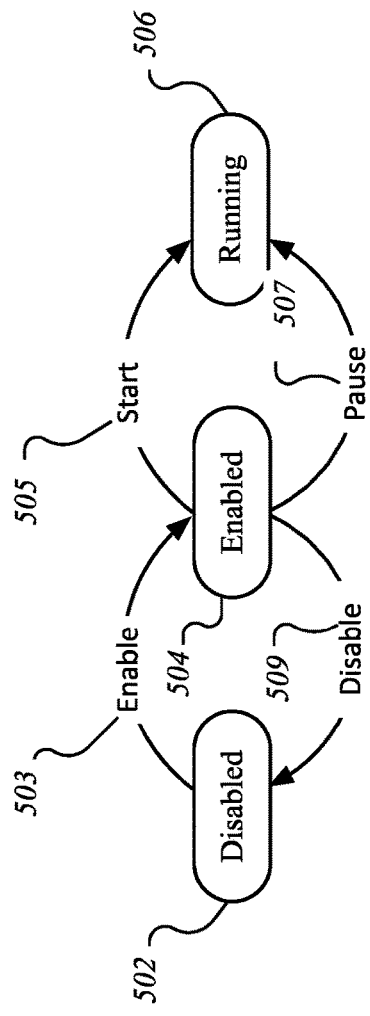
FIGS. 5A-5D illustrate an exemplary command sequence associated with a virtual host controller interface as described herein.
Figure 5B:
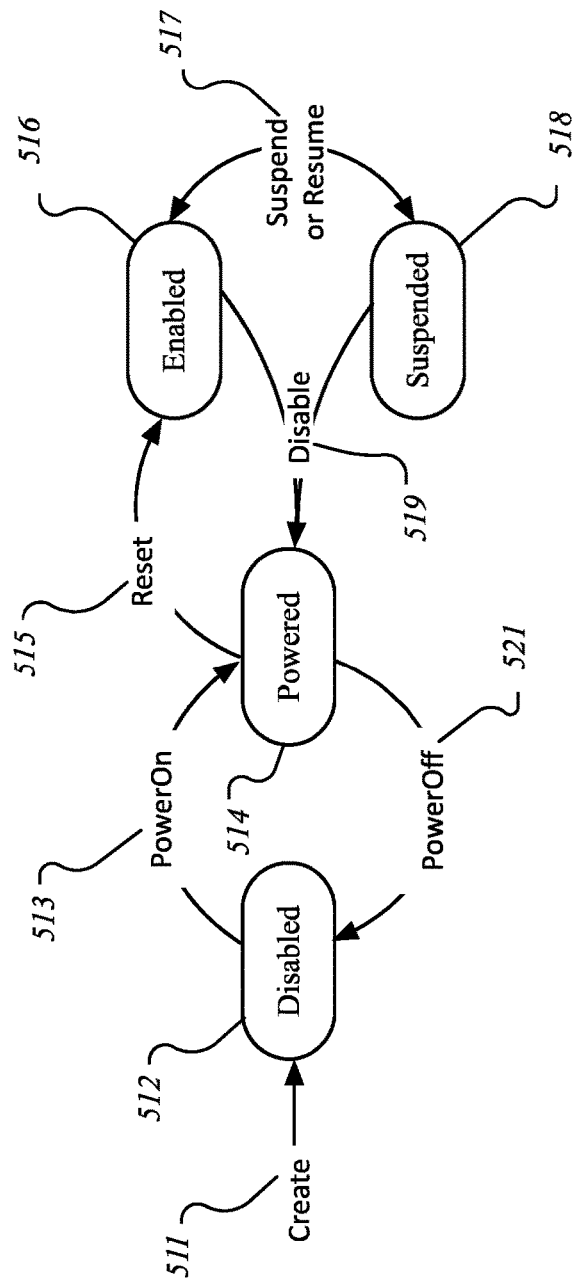
Figure 5C:
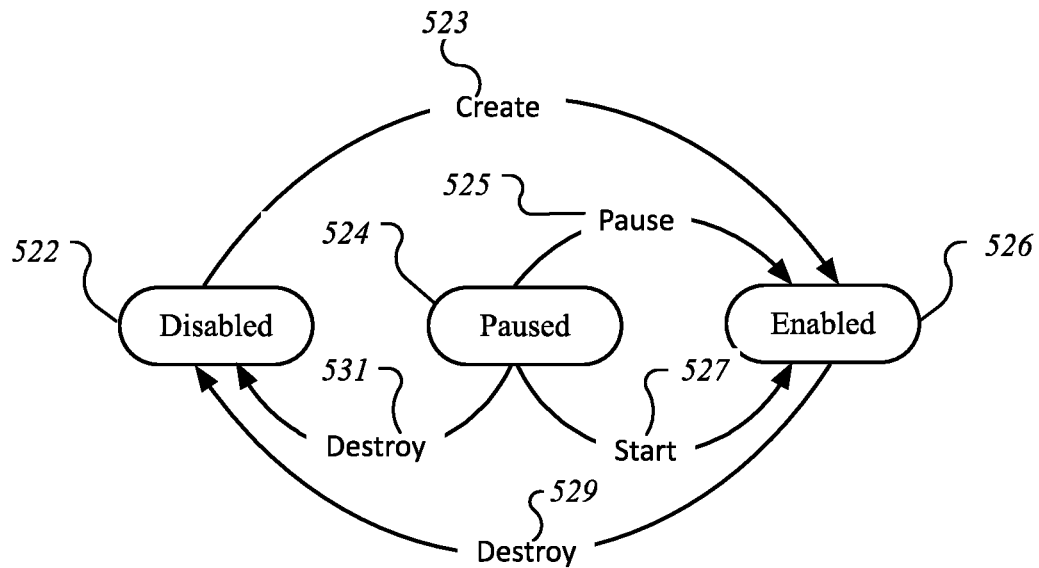
Figure 5D:
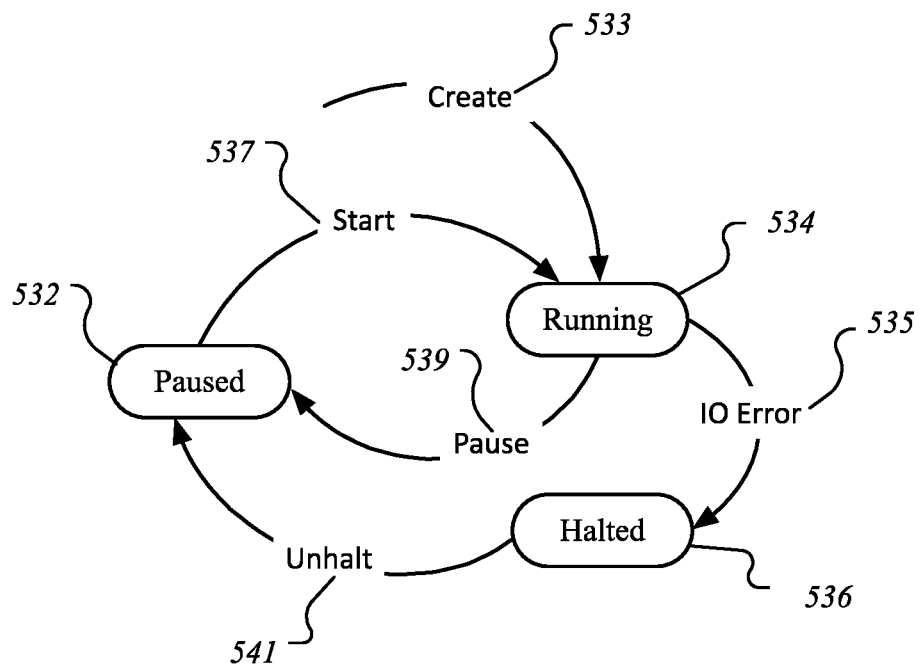

FIGS. 5A-5D illustrate an exemplary command sequence associated with a VHCI interface as described herein. FIG. 5A illustrates controller commands to change VHCI firmware state. FIG. 5B illustrates port state commands to change a port state for a VHCI port. FIG. 5C illustrates device commands to manage the state of a specific device instance. FIG. 5D illustrates endpoint commands to manage the state of an endpoint within a device instance.

As illustrated in FIG. 5A, controller commands are supported to move the VHCI firmware between a disabled state 502, an enabled state 504, and a running state 506. The VHCI firmware (e.g., VHCI firmware 224) defaults to the disabled state 502, which represents quiesced hardware with no software resources allocated. An enable command 503 transitions the VHCI firmware to the enabled state 504, which will allocate resources for the firmware. A start command 505 begins operation of the VHCI firmware, and allows the firmware to generate events and interrupts for the VHCI host driver (e.g., VHCI host driver 214) to process. The VHCI firmware can be quiesced by sending a pause command 507 to transition the firmware back into the enabled state 504. When transitioned from the running state 506 to the enabled state 504, the firmware will stop generating events and interrupts. A disable command 509 will free software resources in the firmware and return the hardware to the disabled state 502.

In one embodiment, each illustrated command follows the exemplary layout of FIG. 4, while one or more fields may be empty. For example, depending on the command, the selector or data fields may not carry any meaningful information. The enable command 503 is responsible for initializing the controller instance with settings that will not change over the lifetime of the controller, and the command response allows the VHCI firmware to communicate capabilities to the VHCI host driver. In one embodiment, the enable command 503 includes a bus number and a protocol version in the selector field. The protocol version indicates the VHCI protocol version the host controller driver requires. If the firmware does not support the specified version, the firmware can return an error in the response to the controller enable command. A bus number may optionally be included in the command that uniquely identifies the location IDs of devices attached to the virtual USB bus. In response to the enable command 503, the VHCI firmware can send a controller enable completion system event. In one embodiment, the messages associated with the start command 505, pause command 507, and disable command 509 do not require a selector, and do not have any meaningful data to convey. As a result, selector and data fields for these commands and responses are set to 0. In addition to the illustrated commands, one embodiment provides a sync controller time command which can be used to the current system time from the master node to the peripheral node (e.g., VHCI master node 314, VHCI peripheral node 324).

As illustrated in FIG. 5B, port commands are supported to move an individual root port between a disabled state 512 to an enabled state 516. Root ports can be created by the VHCI firmware in response to a create command 511 from the VHCI driver. Port state commands and command completion events specify the root port number as the selector. In one embodiment, root ports are in an unpowered (e.g., disabled state 512) by default. A power on command 513 is used to move the root port to a powered state 514. The root port must be moved to the powered state 514 before any port change events may be generated. Port change events will notify the VHCI host driver of a connection on the port. Once a change event is received by the VHCI host driver, the driver can send a reset command 515 to initiate basic enumeration to get the port to transition the port to the enabled state 516. In the enabled state 516, communication with the device becomes possible. Suspend and Resume commands 517 can alter the power state of the attached device using USB selective suspend. A disable command 519 can take a port from the enabled state 516 or the suspended state 518 to a powered state 514. A power off command 521 can be used to transition the port from the powered state 514 to the disabled state 512.

In addition to the illustrated port states and commands, a port status command can also be used to fetch the current port state from the VHCI firmware, and to clear change bits for an individual port. Port status change bits are defined for the data field of the status command to allow port change conditions cleared for the port. The field can be cleared by writing a one to the field when sending a status command to the VHCI firmware, which will clear the field until the change condition re-occurs. The port status command completion event is delivered as a system event and returns values for a variety of port status fields. In one embodiment, supported port status command fields include link state, overcurrent change, connect change, enable change write link state, and link state change. The link state field is valid when the write link state field is set and allows manual adjustment of a link state. If the write link state is set in the command, the link state field of the command is used to update the link state of the port. In one embodiment, a link state change bit is included that indicates when a link state change occurs. The overcurrent change field is set when then overcurrent bit changes from 0 to 1. The connect change field is set when the current change bit changes in value. The enable change is set when the port moves to the Disabled state due to a device-side error, such as an EOF2 violation. In response to a port status command set to the firmware, current status is returned by the firmware as a command completion system event. The command completion event can return status values including whether the port is currently powered, connected, or enabled. Additional status returns can include an overcurrent condition, a resetting condition, a port speed, and a port link state value.

As illustrated in FIG. 5C device commands are provided to manage the state of a specific device instance. The VHCI driver can use a create command 523 to create a device instance. In one embodiment device instances default to the enabled state 526 upon creation, allowing immediate I/O transfers and event generation. A pause command 525 can be used to transition the device into a paused state 524. From a paused state 524, a start command 527 can be used to transition the device back to the enabled state 526 or a destroy command 531 can be used to destroy the device, which transitions the device to the disabled state 522. In one embodiment, an additional instance of the destroy command 529 can be used to destroy a device instance directly from the enabled state 526. Destroy command 529 and destroy command 531 may be the same command or may be different commands. In one embodiment, the device commands follow the exemplary layout 400 for VHCI commands illustrated in FIG. 4, although alternate device command layouts may be used in some embodiments. The VHCI firmware can deliver a command response message to the VHCI driver for device commands as a system event. The create command specifies the root port number associated with the device. The command response message to the create command reports the address assigned to the device. In one embodiment, other than the create command, commands and responses associated with other device states do not transmit any encoded data.

FIG. 5D illustrates endpoint commands to manage the state of an endpoint within a device instance. Endpoints are created via a create command 533. In one embodiment, created endpoints default to their enabled state (e.g. running state 534). An endpoint in the running state 534 can be paused via a pause command 539, which transitions the endpoint to a paused state 532. Following an I/O error 535, endpoints transition to the halted state 536. In one embodiment, after being transitioned to the halted state 536, the endpoint may be required to transition to the paused state 532, via an unhalt command 541, before the endpoint can be transitioned to the running state 534 via a start command 537.

In one embodiment, in response to the endpoint create command 533, the VHCI firmware allocates resources to represent a USB endpoint. The create command 533 includes a data payload that describes the endpoint. The endpoint create command 533 specifies data including the maximum number of bytes the endpoint can send in a single packet and the maximum payload the endpoint can send in a single service interval (e.g., Max ESIT). In one embodiment, for bulk endpoints capable of stream support, the endpoint supports $2^{(n-1)}$ streams. For isochronous or interrupt endpoints, the service interval is $2^{(n-1)}$ microframes, where 1 microframe is 125 microseconds. The command response to the endpoint create command 533 is delivered as a system event. In one embodiment, an additional endpoint destroy command is provided that frees resources associated with the specified endpoint within the VHCI firmware.

A single endpoint state command can be used to change the state of a created endpoint. In one embodiment, the host driver can manually change an endpoint state to the running state 534 or the paused state 532, with the halted state 536 being set in response to an I/O error 535. To clear a halted condition, an endpoint reset command can be used as the unhalt command 541 to transition the endpoint from the halted state 536 to the paused state 532. In one embodiment, an additional flush endpoint buffer command is used to discard buffered data on the receiver of an endpoint.

VHCI Firmware Commands

In some embodiments the VHCI host driver is responsible for sending most of the commands in the system. However, the VHCI firmware is also capable of sending a distinct set of commands to the host driver for processing. Exemplary VHCI firmware commands to the VHCI driver include an endpoint set state command and an endpoint request state command. The endpoint set state command can be used to set an endpoint state to halted in response to an I/O error. The VHCI firmware can use the request endpoint state message to notify the VHCI host driver that the firmware's endpoint state is changing. When the VHCI host controller receives the request endpoint state message, the host controller determines the correct state for the endpoint and must sends the endpoint set state command if a state change is needed. If the request endpoint state command is sent that requests an endpoint to be halted, the VHCI host controller will transition the endpoint to the halted state. In one embodiment request endpoint state commands to set a running or paused state may not immediately result in a state transition for the endpoint. In addition to the firmware endpoint state request, the VHCI host controller also factors in its internal state to determine if an endpoint should be moved to the running state. If either the firmware or VHCI host controller need the endpoint to be paused, the endpoint will be kept in the paused state. If both firmware and host controller agree the endpoint should be running, then a state transition to the running state is made via a set endpoint state command.

VHCI Events

The VHCI host driver is can process events generated by the VHCI firmware or internally. Exemplary events include command completion events, as well as port events, endpoint events, transfer events, and transfer update events. Port events are used to communicate important status changes on a root port of the VHCI firmware. Port events can include events that set change bits in the port status message. Port events are sent as system event messages. Endpoint events are used to signal the VHCI host driver that the specified endpoint should be evaluated for other events. Endpoint events are generated internally or sent on an event channel matching the specified endpoint type (e.g., isochronous events, interrupt events, asynchronous events). Transfer events are used to initiate a data move or update the recipient on the progress of a data move. Transfer events are generated internally or sent on the event channel matching the specified endpoint type. Transfer update events are typically generated internally, and serves as a confirmation that a buffer was delivered. A status code other than success indicates there was a problem with the underlying transport. The number of bytes delivered to the receiver is stored in the data field of the message. In one embodiment, it is possible for a byte count to be non-zero even if the status field indicates an error. A transfer update event can be externally generated for a zero-length transfer in cases where the underlying transport is not capable of zero-length packets. Additionally, one embodiment supports a transfer status event that may be generated by a sender to notify the receiver of an explicit status code for the current transfer.

Data Transfer

To operate efficiently on low-quality links, retransmission of data payloads should be avoided, data should only be transferred when the recipient is certain to accept it, and client-provided I/O buffers should be used whenever possible. Retransmission should be avoided because the retransmission of a data payload on a low-bandwidth link may be expensive, particularly with USB use cases that have arbitrarily large I/O requests. USB 1.x suffered from this issue, which resulted in the PING-NAK protocol with USB 2.0, and saw further refinement with the ERDY protocol in USB 3.0. Data should only be transferred when the recipient is certain to accept it to avoid unnecessary bus congestion for unreceived data and subsequent re-transmission of that data. Client provided I/O buffers should be used to enable transfers to DMA data directly into destination buffers, wherever possible.

The existing USB stack attempts to avoid unnecessary processing on endpoints that will not transfer data by attempting to transfer data only when the recipient has signaled readiness. The USB 1.1 and 2.0 protocol polling model for endpoints tests readiness for transfer by sending tokens or data on the bus as a test for the device, which can slow other endpoints that are ready to transfer data. If the endpoint becomes ready to transfer shortly after the polling interval, the endpoint waits to receive the next token before transferring data. This is inefficiency is somewhat mitigated by USB 3.0's ERDY protocol, which allows a device endpoint to signal readiness asynchronously.

Additionally, the driver model for USB software allows both kernel-mode and user-mode clients to allocate their own I/O buffers. However, the USB stack does not impose any specific requirements on these buffers, and they are often arbitrarily sized and aligned. Furthermore, the buffers may become significantly fragmented. To encourage direct reuse of these buffers, protocol headers and data structures should not be wrapped around the data payload, allowing transfers to directly DMA into the destination buffer whenever possible.

Embodiments described herein optimize data transfer between simulated USB devices by implementing techniques to operate efficiently on low-quality links. As VHCI is intended to operate in a transport agnostic manner, worst-case conditions are assumed to maximize the flexibility of the system. In one embodiment, data movement between a VHCI host driver and VHCI firmware described herein is accomplished with Receive Descriptor (RxD) data structures, which are transmitted via the event channels illustrated in FIG. 2. The RxD communicates to the sender how many bytes of data can be accepted by the receiver, meaning that for IN transfers the VHCI host driver will send RxDs to the VHCI firmware, and for OUT transfers the VHCI firmware will send RxDs to the VHCI host driver. Depending on the implementation of the VHCI firmware, either Precise or Buffered RxDs (PRxD and BRxD, respectively) may be used when the firmware is the receiver. In one embodiment, PRxDs are always used when the VHCI host driver is the receiver.

Precise Receive Descriptors

Precise Receive Descriptors (PRxDs) may be used when the system has information that indicates the amount of data that can be accepted by the receiver. For example, during IN transfers the VHCI host driver is passed an I/O request with a memory descriptor and a specific size. A PRxD can relay the exact capacity of the buffer to the VHCI firmware, which prevents unnecessary data transfers between the peripheral and master nodes, and eliminates buffer copies by allowing the original IO buffer to be used as the DMA target.

If a PRxD is received before there is data to transmit, the PRxD will be stored by the sender until it is aborted or satisfied. If an I/O request is enqueued at the sender before a PRxD has been received, the I/O request will similarly be stored by the sender until the request is aborted or has a matching PRxD to satisfy the request. During PRxD transfers, the function drivers on either end of the link initiate precisely-sized I/O requests, and the receiver sends the first message, a PRxD encoding its transfer size, and enqueues a read operation to fill the buffer. The data source calculates the number of bytes to send and initiates the data movement. Once the data has been delivered, both ends internally generate a transfer update event to determine the byte count transferred and handle any failures from the underlying transport.

USB transfers are completed by a transfer whose length is not a multiple of the endpoint's maximum packet size. VHCI applies the same rules when determining if a PRxD should be completed. In cases where the data payload is a multiple of the endpoint's maximum packet size, subsequent data payloads can be delivered for the PRxD. The sender may explicitly complete the PRxD by delivering a transfer status message to provide an appropriate status to the data recipient and complete the transfer. In addition to the zero-length transfer scenario, a transfer status message can be used to notify the receiver of an overrun error. When the sender's payload is a multiple of the endpoint's maximum packet size, and the PRxD is larger than the payload, the sender may optionally buffer the data until either the entire PRxD is satisfied or a subsequent I/O request includes a short packet.

Figure 6A:
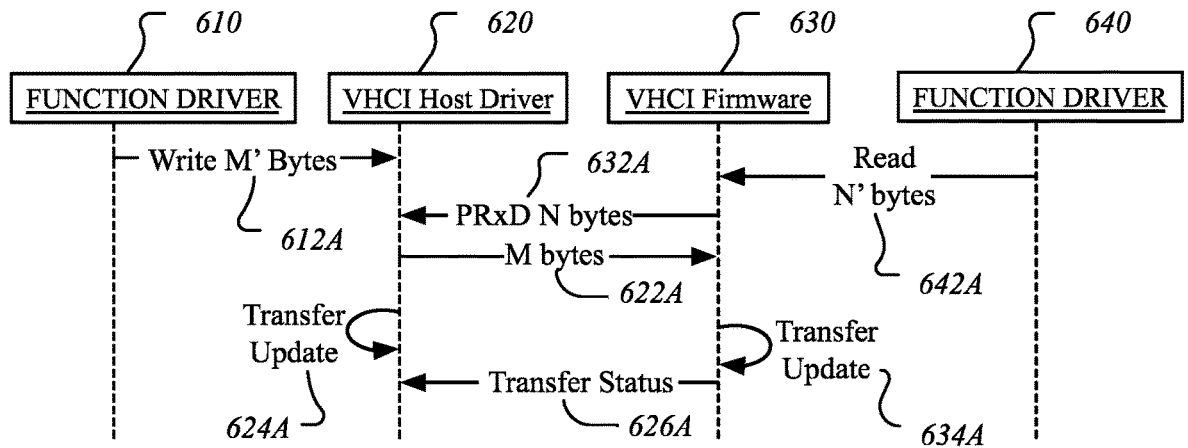
FIG. 6A-6C are sequence diagrams illustrating exemplary precise receive transfers, according to embodiments.
Figure 6B:
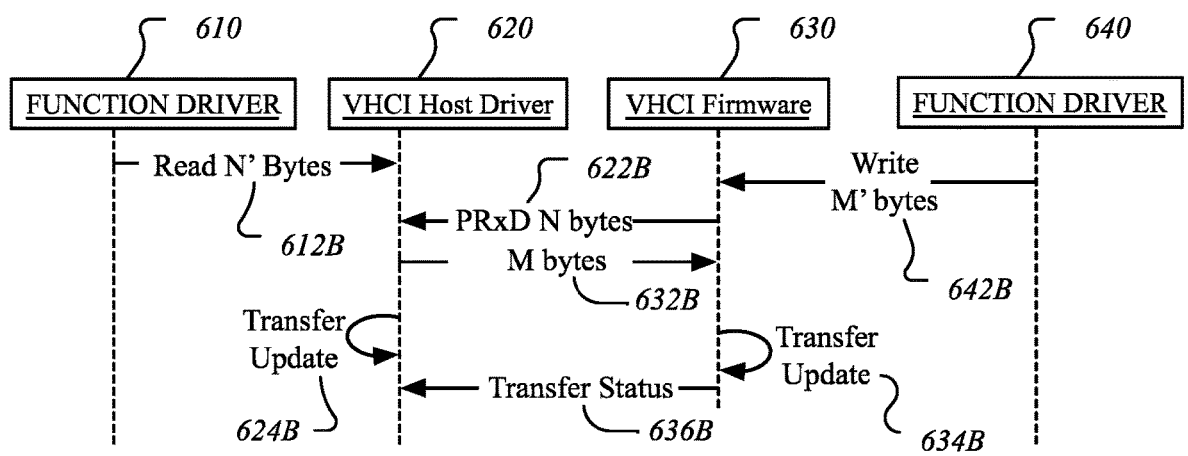
Figure 6C:
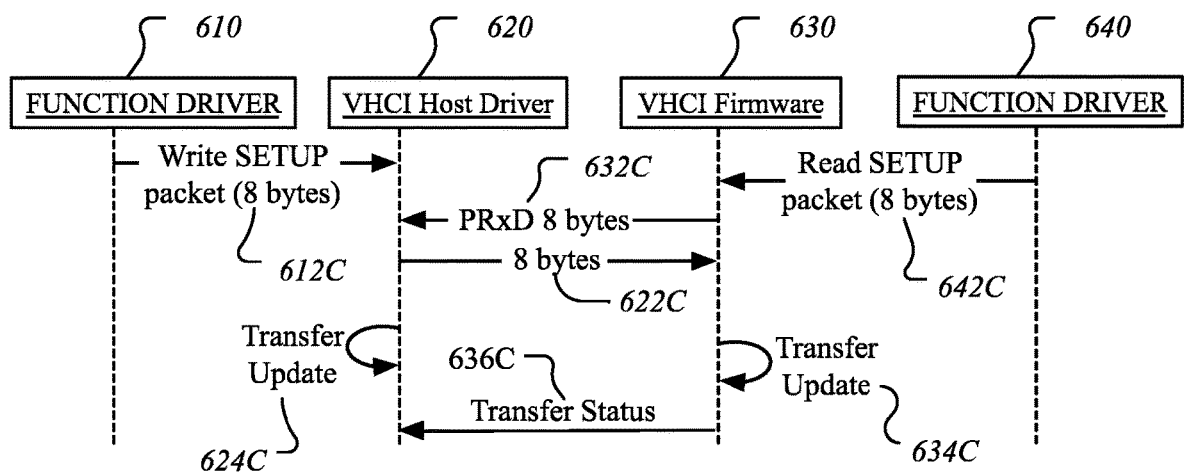

FIG. 6A-6C are sequence diagrams illustrating exemplary precise receive transfers. FIG. 6A shows a PRxD OUT transfer. FIG. 6B shows a PRxD IN transfer, FIG. 6C shows a PRxD control transfer. Each transfer is conducted over a VHCI messaging system that enables command, event, and data transport between a VHCI host driver and VHCI firmware. From the perspective of the function drivers in the system, the data transfers are performed as USB transfers. To enable the actual transfer of data, VHCI translates the USB commands to the underlying logical and physical interconnect used by the peripheral device.

FIG. 6A shows a PRxD OUT transfer in which function driver 610 is to send data to function driver 640. The OUT transfer is facilitated by the messaging interface between the VHCI host driver 620 and the VHCI firmware 630. Function driver 610 sends a write M' bytes request (612A) to the VHCI host driver 620. Function driver 640 sends a read N' bytes request (642A) to the VHCI host driver 620. The transfer is not initiated until the VHCI firmware 630 sends a PRxD (632A) to VHCI host driver 620 requesting a N byte write. The VHCI host driver 620 can then transfer M bytes (622A) to the VHCI firmware 630. Transfer update events 624A, 634A are generated internally in the VHCI host driver 620 and the VHCI firmware 630 respectively to serve as confirmation that a buffer was delivered. A transfer status (626A) command can then be sent from the VHCI host driver 620 to notify the VHCI firmware 630 of an explicit status code for the current transfer. For a PRxD OUT transfer, multiple OUT packets may be transmitted to satisfy the number of bytes requested to be read.

FIG. 6B shows a PRxD IN transfer in which function driver 610 is to receive data to function driver 640 via the messaging interface between the VHCI host driver 620 and the VHCI firmware 630. Function driver 640 sends a write M' bytes request (642B) to the VHCI firmware 630. Function driver 610 sends a read N' bytes request (612B) to VHCI host driver 620. The transfer is not initiated until VHCI host driver 620 sends a PRxD (622B) to the VHCI firmware 630 requesting a N byte write. The VHCI firmware 630 can then transfer M bytes (632B) to the VHCI host driver 620. Transfer update events 624B, 634B are generated internally in the VHCI host driver 620 and the VHCI firmware 630 respectively to serve as confirmation that a buffer was delivered. A transfer status (636B) command can then be sent from the VHCI firmware 630 to notify the VHCI host driver 620 of an explicit status code for the current transfer.

The PRxD transfers illustrated in FIG. 6A-6B are provided as a general communication framework. In one embodiment, a transfer with an integral short packet can be performed. Transfers that are not a multiple of the endpoint's maximum packet size will complete when the transfer update events are processed. Transfers that have a length equal to a multiple of the endpoint's maximum packet size will not complete the PRxD, allowing multiple transfers to be delivered for with same PRxD. The sender may optionally buffer transfers with a length equal to a multiple of the endpoint's maximum packet size and deliver the combined payload as a single transfer. Zero-length transfers are not possible on many transports. Accordingly, to simulate a zero-length transfer, the VHCI firmware 630 can generate a transfer status message in lieu of sending a zero-length payload.

To determine the payload size for a transfer, the sender evaluates its I/O request size (M'), the bytes specified by the PRxD (N), and the USB endpoint's max packet size (MPS) to determine the byte count to transmit (M) and the status of the transfer. USB packet handling rules to apply are shown in Table 1.

TABLE 1

USB packet handling rules for Precise Receive Descriptors

| Case | | M | Sender Status | Receiver Status |
| --- | --- | --- | --- | --- |
| A | M' < N, (M' % MPS) == 0 | M' | Success | Waiting |
| B | M' < N, (M' % MPS) > 0 | M' | Success | Success |
| C | M' == N | M' | Success | Success |
| D | M' > N, (N % MPS) == 0 | N | Waiting | Success |
| E | M' > N, (N % MPS) > 0 | N, round down to nearest MPS | Waiting | Waiting |

USB receive operations are considered complete when either the exact number of bytes is transferred, or the transfer is not an even multiple of the USB endpoint's max packet size (a short packet). In case A, the sender I/O request will complete successfully, but the PRxD has not received its full payload or a short packet. The next sender I/O will contribute to the same receive buffer, and will use the remainder of the RxD as N when determining status for the next sender I/O request. In case B, the sender I/O request included a short packet, so both sender and receiver I/O requests complete successfully. In case C, the sender I/O request transferred exactly the number of bytes expected, so both sender and receiver I/O requests complete successfully. In case D, the receiver I/O will complete successfully because the sender transferred exactly the number of bytes expected, and the sender I/O will contribute its remaining bytes to the next PRxD. In case E, a multiple of MPS was transferred, but neither sender nor receiver I/O request is complete because the payload length was rounded down to the nearest MPS. This situation is a transaction error for the sender and an overrun error for the receiver.

In one embodiment when the VHCI host driver 620 determines an OUT transfer should end with an overrun error, the host driver rounds the payload size down to the nearest max packet size and then uses a transfer status message to notify the receiver of the error. When the VHCI firmware 630 determines an IN transfer should end with an overrun error, the firmware rounds the payload size down to the nearest max packet size and then uses a transfer status message to notify the VHCI host driver 620 of the error condition.

One embodiment provides support for pausing PRxD transfers. Pausing an endpoint is necessary to manage endpoint state and abort pending transfers. The Endpoint Pause command is used to cleanly quiesce the enqueued IO and keep the VHCI host driver 620 and VHCI firmware 630 in a consistent state. In one embodiment, pausing an endpoint uses the following sequence of events: 1) the VHCI host driver discards receive descriptors and adjusts internal state to discard any new receive descriptors, 2) the VHCI host driver waits for and processes transfer update events for pending transfer buffers, 3) the VHCI host driver sends Endpoint Pause command to the VHCI firmware, 4) the VHCI firmware discards receive descriptors and adjusts internal state to discard any new receive descriptors 5) the VHCI firmware waits for and processes transfer update events for pending transfer buffers, and 6) the VHCI firmware sends endpoint pause command completion event to the VHCI host driver. After the endpoint pause command has completed, all in-flight data has been delivered, and new receive descriptors will not initiate any further data movement. In this state, both the VHCI host driver and VHCI firmware can modify their respective transfer queues. Although the VHCI host driver issues the commands to pause an endpoint, the VHCI firmware can drive endpoint state changes via a request endpoint state message.

After the VHCI host driver 620 and VHCI firmware 630 have manipulated their transfer queues, the endpoint can be restarted. In one embodiment, restarting an endpoint uses the following sequence of events: 1) the VHCI host driver adjusts internal state to accept new receive descriptors, 2) the VHCI host driver sends Endpoint Start command to the VHCI firmware, 3) the VHCI firmware adjusts internal state to accept new receive descriptors, 4) the VHCI firmware generates receive descriptors based on current transfer state, 5) the VHCI firmware sends Endpoint Start command completion event to the VHCI host driver, and 6) the VHCI host driver generates receive descriptors based on current transfer state. The VHCI firmware can request an endpoint start again with the request endpoint start message. When both the VHCI firmware and VHCI host driver agree the endpoint is to be restarted, the VHCI host driver will issue the endpoint start command. Although the VHCI host driver issues the commands to pause an endpoint, the VHCI firmware can drive endpoint state changes via the request endpoint state message.

FIG. 6C illustrates a PRxD Control Transfer between function driver 610 and function driver 640. USB control transfers consist of a setup and a status phase, and can optionally include a data phase between the setup and status phase. Control transfers are used to configure and enumerate a USB device with a host. In the setup stage a setup packet is sent. Function driver 610 can write a setup packet (612C) to VHCI host driver 620, while function driver 640 sends a read setup packet (642C) to VHCI firmware 630. In one embodiment 8 byte packets are sent, although other setup packet sizes may be used. VHCI firmware 630 sends a PRxD (632C) to VHCI host driver 620, which sends a setup packet (622C) to the VHCI firmware 630. Transfer update events 624C, 634C are generated internally in the VHCI host driver 620 and the VHCI firmware 630 respectively to server as confirmation that a buffer was delivered. After the setup phase, one or more OUT or IN transfers can be performed as described herein. However, the data transfer phase is optional and can be bypassed if no data transfer is required for the control transfer. The control transfer process completes with a transfer status message (636C) from VHCI firmware 630 to VHCI host driver 620. If a data transfer occurs between the setup and status phase, a transfer status message is sent to end the data phase. In the event of an error while processing the setup or data phases of a control request, the device will send a transfer status message with an error code set in the status field. Sending the transfer status message with the error code will cause the host driver to retire the current control request with an error.

Buffered Receive Descriptors

Buffered Receive Descriptors (BRxDs) may be used when the receiver will buffer a block of data and allow a peripheral to consume it over time. When the buffer has been fully consumed, or the peripheral consumes data in such a way that a transaction error should be reported, the receiver must report status and bytes consumed to the sender.

Figure 7A:
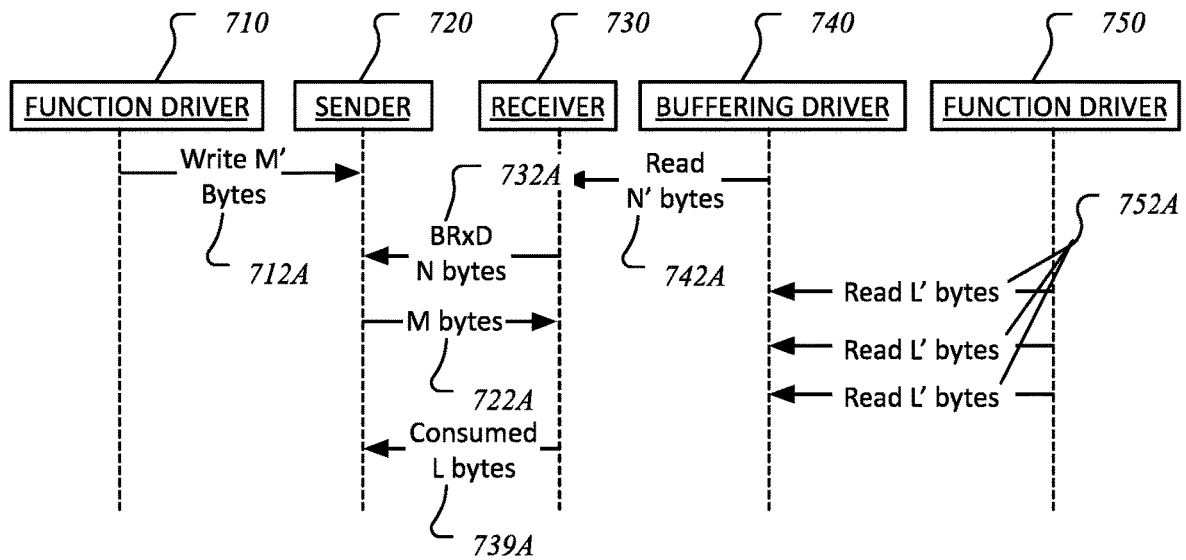
FIGS. 7A-7B illustrate I/O request sequences associated with buffered transfers.
Figure 7B:
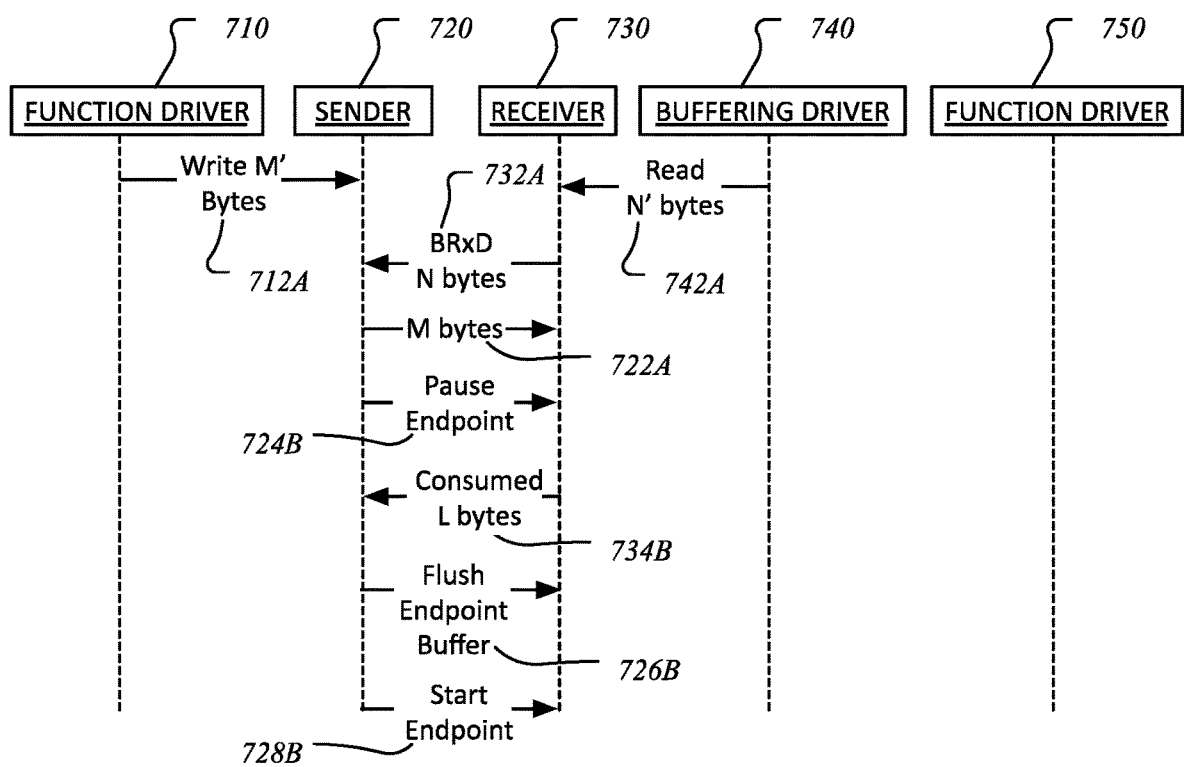

FIGS. 7A-7B illustrate I/O request sequences associated with buffered transfers. FIG. 7A illustrates a buffered transaction using BRxDs. FIG. 7B illustrates an I/O request sequence for a sender to abort a BRxD transaction. FIGS. 7A and 7B each illustrate multiple function drivers 710, 750 with communication facilitated by a buffering driver 740 on the receiver.

As shown in FIG. 7A, function driver 710 sends a write M' bytes (712A) message to a sender 720, which, in one embodiment, can be a VHCI host driver or VHCI firmware. The buffering driver 740 sends a read N' bytes message (742) to the receiver 730, which sends a BRxD (732A) requesting a read of N bytes. The sender 720 then sends M bytes (722A) to the receiver 730. The buffering driver 740 on the receiver 730 allows the function driver 750 to perform multiple reads of L' bytes (752A). For transfers using BRxDs, N' and N are a multiple of the max packet size of the USB endpoint, which simplifies transaction error detection at the sender end and ensures the receiver will always accept full USB packets.

In one embodiment the sender 720 evaluates its I/O request size (M'), the bytes specified by the BRxD (N), and the USB endpoint's max packet size (MPS) in the same way the sizes are evaluated for a PRxD. The receiver 730 evaluates its buffered payload (M), the size of the function driver's I/O request (L'), and the USB endpoint's max packet size (MPS) to determine the byte count (L) to copy into the function driver's buffer and the status of the transfer. Applicable packet handling rules apply as shown in Table 2.

TABLE 2

USB packet handling rules for Buffered Receive Descriptors

| Case | L | | Receiver Status | Function Driver Status |
|---|---|---|---|---|
| A | M < L', (M' % MPS) == 0 | M | Success | Waiting |
| B | M < L', (M' % MPS) > 0 | M | Success | Success |
| C | M == L' | M | Success | Success |
| D | M > L', (L' % MPS) == 0 | L' | Waiting | Success |
| E | M > L', (L' % MPS) > 0 | L' | Transaction Error | Overrun Error |

When the receiver 730 has either successfully transferred the entire buffer payload to the function driver 750, or has determined that an error has occurred, the receiver 730 reports the number of bytes transferred and the status of the transfer (734A) back to the sender 720.

As shown in FIG. 7B, in the case of a sender abort, the sender 720 requests the receiver 730 to discard buffered data. The sender 720 will issue a pause endpoint command (724B) to the receiver, which suspends completing I/O requests from function driver 710. The receiver 730 replies with a byte count and status for the current buffered payload (734B). Once status has been received, the sender 720 adjusts an internal queue of transfers and issues a flush endpoint buffer command (726B) to discard the buffered data at the receiver 730. If the aborted I/O spans multiple receive descriptors, the flush endpoint buffer command (726) may be issued more than once. Once the operation is complete, transfers are restarted on the endpoint via a start endpoint command (728B). With buffered transfers, a receive abort will be a rare scenario, and generally indicates the receiver is shutting down or has experienced a fatal error. In this case, the receiver will prematurely report a byte count for the transfer and an appropriate error status to the sender.

Buffered Periodic Transfer Considerations

USB transfer types are broadly categorized as asynchronous (control and bulk) or periodic (interrupt and isochronous). Asynchronous transfers are processed as quickly as possible, and are therefore easily supported by most transports connecting the peripheral and master nodes. By contrast, periodic transfers have a specific timeframe for completion, the basis of which is a hardware-generated frame number that specialized hardware depends on to control when scheduled transfers are processed. The frame interval can be as short as 125 μs for high-performance devices.

The peripheral node is not expected to provide specialized hardware to assist with management of periodic transfers scheduled for the future. Accordingly, the USB software stack can define a mechanism to provide the best possible approximation of the service interval on the endpoint. Many operating systems are not realtime capable, and the service interval approximation will be susceptible to high interrupt latency and scheduling variances. Additionally, endpoints with a 125 μs service interval may incur greater CPU usage and are less likely to see ideal quality of service.

The latency of transferring data between the peripheral and master nodes is of concern with periodic transfers. To minimize the impact of this latency and allow the closest possible approximation of the endpoint's service interval, the transfer should take place before the expected transfer interval elapses. The receiver is therefore responsible for delaying transfer completions until the appropriate time.

An exemplary usage model for periodic transfers is to schedule a block of transfers extending into the future and asynchronously fill the buffer with valid data as the transfer time approaches. To accommodate this model, periodic data cannot be transferred between the peripheral and master nodes as soon as the I/O request is submitted. Instead the data transfer is delayed until a threshold near, but still before, the transfer time. The receiver will cache transfers ahead of the transfer time and release the transfer to the receiving function driver at the appropriate time. Senders will not be able to modify buffers or schedule transfers within the caching period. In USB host controllers, this concept is known as a "keepaway interval." Because the system described herein here is made up of non-realtime nodes, the keepaway interval will be defined to be large enough to accommodate typical interrupt latencies and scheduling variances.

Time Synchronization for Buffered Transfer

The sender and receiver must agree on the current time to schedule and complete transfers in a targeted interval. In existing USB host controller hardware, time synchronization is accomplished via a hardware-generated frame number with 125 μs granularity. Because the USB frame number is a fixed time interval, a virtualized frame number can be generated by dividing the node's system time to determine the number of 125 μs intervals that have elapsed. Due to clock drift considerations, the master node's clock should be accepted as the correct time, and the peripheral node must periodically resynchronize with the host. The update interval is set such that the clock drift between updates is less than 62.5 μs (0.5*125 μs). The update interval can be adjusted if the clock drift calculated from periodic updates indicates that clock drift is larger or smaller than 62.5 μs. In one embodiment the peripheral node can request an updated controller time by issuing a request controller time event and the master node can update the peripheral's time by issuing a sync controller time command. If available, the link latency time between the master and peripheral nodes may be used to adjust the updated time.

General Transport Considerations

VHCI as described herein is transport agnostic, such that VHCI can be implemented within a data processing system using any transport mechanism supported by the data processing system. While VHCI is transport agnostic, general transport considerations are present. In one embodiment, where VHCI transport is entirely internal to the data processing system and uses one or more internal system busses or transfer fabrics, an existing I/O buffer copy system can be used as the underlying transport mechanism for messages between the VHCI master node and VHCI peripheral node within the system. In one embodiment, VHCI messaging can be configured to enable multiple message channels of the VHCI message protocol (e.g., commands, system events, isochronous events, interrupt events, asynchronous events, and data as in VHCI message protocol 215). In such configuration, message headers can be used to enable multi-channel transport over a single high-speed serial channel.

In one embedment the VHCI messaging protocol assumes messages will be delivered. Accordingly, the underlying transport must ensure message and payload delivery. Accordingly, the transport used to connect the master and peripheral nodes can include error checking and retry logic appropriate to the transport if the transport mechanism is not inherently reliable. The error checking and retry logic can wrap error checking codes around messages and data payloads and strip the error checking codes before passing the data payload to the ultimate recipient. Furthermore, transports that connect the master and peripheral nodes in an open environment, such as a network, can employ encryption and security measures as appropriate.

Embodiments described herein include one or more application programming interfaces (APIs) in an environment in which calling program code interacts with other program code that is called through one or more programming interfaces. Various function calls, messages, or other types of invocations, which further may include various kinds of parameters, can be transferred via the APIs between the calling program and the code being called. In addition, an API may provide the calling program code the ability to use data types or classes defined in the API and implemented in the called program code.

An API allows a developer of an API-calling component (which may be a third-party developer) to leverage specified features provided by an API-implementing component. There may be one API-calling component or there may be more than one such component. An API can be a source code interface that a computer system or program library provides to support requests for services from an application. An operating system (OS) can have multiple APIs to allow applications running on the OS to call one or more of those APIs, and a service (such as a program library) can have multiple APIs to allow an application that uses the service to call one or more of those APIs. An API can be specified in terms of a programming language that can be interpreted or compiled when an application is built.

In some embodiments the API-implementing component may provide more than one API, each providing a different view of or with different aspects that access different aspects of the functionality implemented by the API-implementing component. For example, one API of an API-implementing component can provide a first set of functions and can be exposed to third party developers, and another API of the API-implementing component can be hidden (not exposed) and provide a subset of the first set of functions and provide another set of functions, such as testing or debugging functions which are not in the first set of functions. In other embodiments the API-implementing component may itself call one or more other components via an underlying API and thus be both an API-calling component and an API-implementing component.

An API defines the language and parameters that API-calling components use when accessing and using specified features of the API-implementing component. For example, an API-calling component accesses the specified features of the API-implementing component through one or more API calls or invocations (embodied for example by function or method calls) exposed by the API and passes data and control information using parameters via the API calls or invocations. The API-implementing component may return a value through the API in response to an API call from an API-calling component. While the API defines the syntax and result of an API call (e.g., how to invoke the API call and what the API call does), the API may not reveal how the API call accomplishes the function specified by the API call. Various API calls are transferred via the one or more application programming interfaces between the calling (API-calling component) and an API-implementing component. Transferring the API calls may include issuing, initiating, invoking, calling, receiving, returning, or responding to the function calls or messages; in other words, transferring can describe actions by either of the API-calling component or the API-implementing component. The function calls or other invocations of the API may send or receive one or more parameters through a parameter list or other structure. A parameter can be a constant, key, data structure, object, object class, variable, data type, pointer, array, list or a pointer to a function or method or another way to reference a data or other item to be passed via the API.

Furthermore, data types or classes may be provided by the API and implemented by the API-implementing component. Thus, the API-calling component may declare variables, use pointers to, use or instantiate constant values of such types or classes by using definitions provided in the API.

Generally, an API can be used to access a service or data provided by the API-implementing component or to initiate performance of an operation or computation provided by the API-implementing component. By way of example, the API-implementing component and the API-calling component may each be any one of an operating system, a library, a device driver, an API, an application program, or other module (it should be understood that the API-implementing component and the API-calling component may be the same or different type of module from each other). API-implementing components may in some cases be embodied at least in part in firmware, microcode, or other hardware logic. In some embodiments, an API may allow a client program to use the services provided by a Software Development Kit (SDK) library. In other embodiments an application or other client program may use an API provided by an Application Framework. In these embodiments the application or client program may incorporate calls to functions or methods provided by the SDK and provided by the API or use data types or objects defined in the SDK and provided by the API. An Application Framework may in these embodiments provide a main event loop for a program that responds to various events defined by the Framework. The API allows the application to specify the events and the responses to the events using the Application Framework. In some implementations, an API call can report to an application the capabilities or state of a hardware device, including those related to aspects such as input capabilities and state, output capabilities and state, processing capability, power state, storage capacity and state, communications capability, etc., and the API may be implemented in part by firmware, microcode, or other low-level logic that executes in part on the hardware component.

The API-calling component may be a local component (i.e., on the same data processing system as the API-implementing component) or a remote component (i.e., on a different data processing system from the API-implementing component) that communicates with the API-implementing component through the API over a network. An API-implementing component may also act as an API-calling component (i.e., it may make API calls to an API exposed by a different API-implementing component) and an API-calling component may also act as an API-implementing component by implementing an API that is exposed to a different API-calling component.

The API may allow multiple API-calling components written in different programming languages to communicate with the API-implementing component (thus the API may include features for translating calls and returns between the API-implementing component and the API-calling component); however the API may be implemented in terms of a specific programming language. An API-calling component can, in one embedment, call APIs from different providers such as a set of APIs from an OS provider and another set of APIs from a plug-in provider and another set of APIs from another provider (e.g. the provider of a software library) or creator of the another set of APIs.

Exemplary Computing Device Architecture

Figure 8:
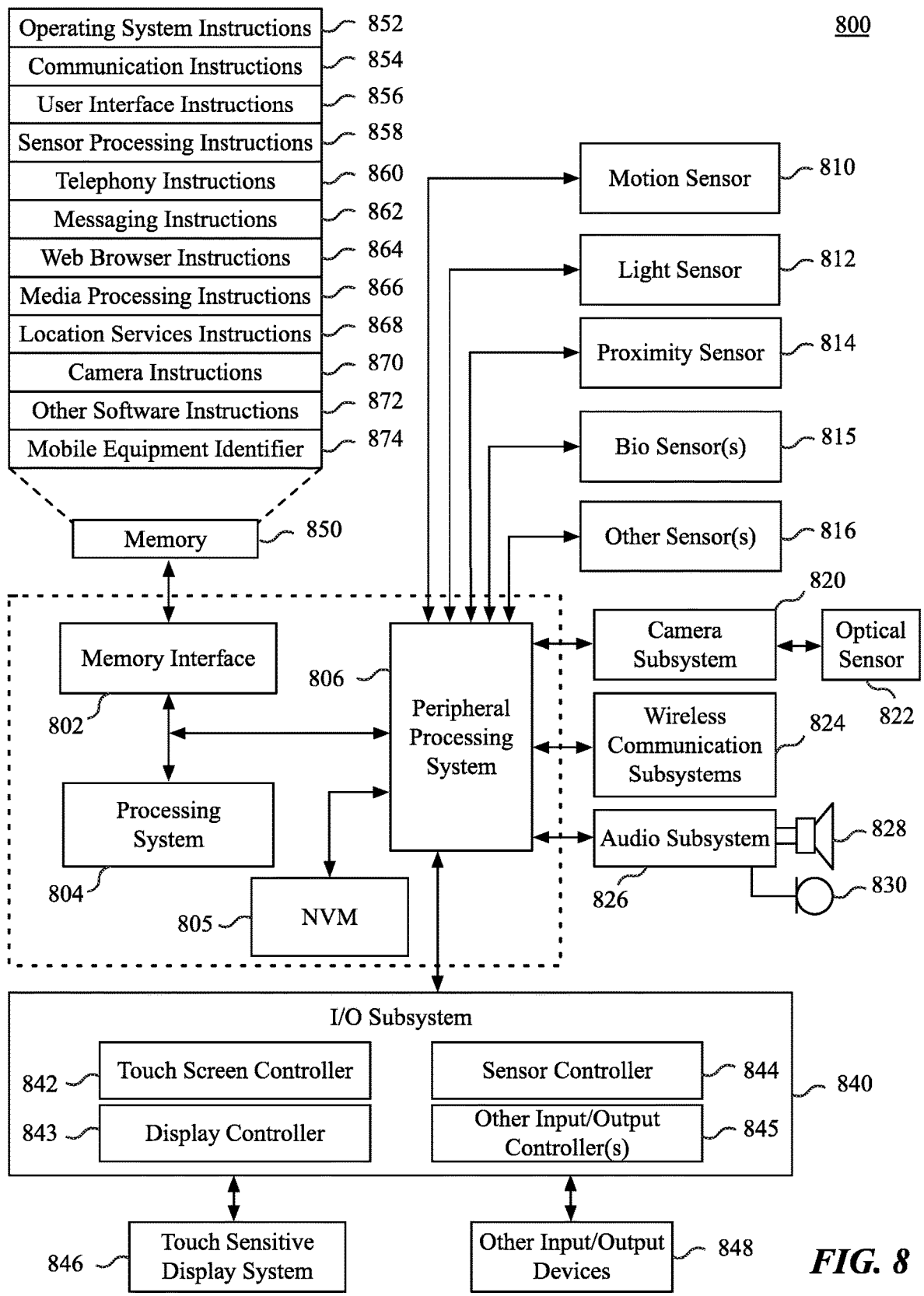
FIG. 8 is a block diagram of a computing device architecture, according to an embodiment.

FIG. 8 is a block diagram of a computing device architecture 800, according to an embodiment. The computing device architecture 800 includes a memory interface 802, a processing system 804, and a peripheral processing system 806. The peripheral processing system 806 which can implement VHCI according to embodiments described herein. The various components can be coupled by one or more communication buses, fabrics, or signal lines. The various components can be separate logical components or devices or can be integrated in one or more integrated circuits, such as in a system on a chip integrated circuit. The processing system 804 may include multiple processors and/or co-processors. The various processors within the processing system 804 can be similar in architecture or the processing system 804 can be a heterogeneous processing system. In one embodiment the processing system 804 is a heterogeneous processing system including one or more data processors, image processors and/or graphics processing units.

The memory interface 802 can be coupled to memory 850, which can include high-speed random-access memory such as static random-access memory (SRAM) or dynamic random-access memory (DRAM). The memory can store runtime information, data, and/or instructions are persistently stored in non-volatile memory 805, such as but not limited to flash memory (e.g., NAND flash, NOR flash, etc.). Additionally, at least a portion of the memory 850 is non-volatile memory. The connection between the processing system 804 and memory 850 to the non-volatile memory 805 can be facilitated via the peripheral processing system 806.

Sensors, devices, and subsystems can be coupled to the peripheral processing system 806 to facilitate multiple functionalities. For example, a motion sensor 810, a light sensor 812, and a proximity sensor 814 can be coupled to the peripherals processing system 806 to facilitate the mobile device functionality. Other sensors 816 can also be connected to the peripherals processing system 806, such as a positioning system (e.g., GPS receiver), a temperature sensor, a biometric sensor, or other sensing device, to facilitate related functionalities. A camera subsystem 820 and an optical sensor 822, e.g., a charged coupled device (CCD) or a complementary metal-oxide semiconductor (CMOS) optical sensor, can be utilized to facilitate camera functions, such as recording photographs and video clips.

The peripheral processing system 806 can enable a connection to communication peripherals including one or more wireless communication subsystems 824, which can include radio frequency receivers and transmitters and/or optical (e.g., infrared) receivers and transmitters. The specific design and implementation of the wireless communication subsystems 824 can depend on the communication network(s) over which a mobile device is intended to operate. For example, a mobile device including the illustrated computing device architecture 800 can include wireless communication subsystems 824 designed to operate over a network using Time Division, Multiple Access (TDMA) protocols, Global System for Mobile Communications (GSM) protocols, Code Division, Multiple Access (CDMA) protocols, Long Term Evolution (LTE) protocols, and/or any other type of wireless communications protocol.

In particular, the wireless communication subsystems 824 can provide a communications mechanism over which a client browser application can retrieve resources from a remote web server. The peripheral processing system 806 can also enable an interconnect to an audio subsystem 826, which can be coupled to a speaker 828 and a microphone 830 to facilitate voice-enabled functions, such as voice recognition, voice replication, digital recording, and telephony functions.

The peripheral processing system 806 can enable a connection to an I/O subsystem 840 that includes a touch screen controller 842 and/or other input controller(s) 845. The touch screen controller 842 can be coupled to a touch sensitive display system 846 (e.g., touch-screen). The touch sensitive display system 846 and touch screen controller 842 can, for example, detect contact and movement and/or pressure using any of a plurality of touch and pressure sensing technologies, including but not limited to capacitive, resistive, infrared, and surface acoustic wave technologies, as well as other proximity sensor arrays or other elements for determining one or more points of contact with a touch sensitive display system 846. Display output for the touch sensitive display system 846 can be generated by a display controller 843. In one embodiment the display controller 843 can provide frame data to the touch sensitive display system 846 at a variable frame rate.

In one embodiment a sensor controller 844 is included to monitor, control, and/or processes data received from one or more of the motion sensor 810, light sensor 812, proximity sensor 814, or other sensors 816. The sensor controller 844 can include logic to interpret sensor data to determine the occurrence of one of more motion events or activities by analysis of the sensor data from the sensors.

In one embodiment the peripheral processing system 806 can also enable a connection to one or more bio sensor(s) 815. A bio sensor can be configured to detect biometric data for a user of computing device. Biometric data may be data that at least quasi-uniquely identifies the user among other humans based on the user's physical or behavioral characteristics. For example, in some embodiments the bio sensor(s) 815 can include a finger print sensor that captures fingerprint data from the user. In another embodiment, bio sensor(s) 815 include a camera that captures facial information from a user's face. In some embodiments the bio sensor(s) 815 can maintain previously captured biometric data of an authorized user and compare the captured biometric data against newly received biometric data to authenticate a user.

In one embodiment the I/O subsystem 840 includes other input controller(s) 845 that can be coupled to other input/control devices 848, such as one or more buttons, rocker switches, thumb-wheel, infrared port, USB port, and/or a pointer device such as a stylus, or control devices such as an up/down button for volume control of the speaker 828 and/or the microphone 830.

In one embodiment, the memory 850 coupled to the memory interface 802 can store instructions for an operating system 852, including portable operating system interface (POSIX) compliant and non-compliant operating system or an embedded operating system. The operating system 852 may include instructions for handling basic system services and for performing hardware dependent tasks. In some implementations, the operating system 852 can be a kernel or micro-kernel based operating system.

The memory 850 can also store communication instructions 854 to facilitate communicating with one or more additional devices, one or more computers and/or one or more servers, for example, to retrieve web resources from remote web servers. The memory 850 can also include user interface instructions 856, including graphical user interface instructions to facilitate graphic user interface processing.

Additionally, the memory 850 can store sensor processing instructions 858 to facilitate sensor-related processing and functions; telephony instructions 860 to facilitate telephone-related processes and functions; messaging instructions 862 to facilitate electronic-messaging related processes and functions; web browser instructions 864 to facilitate web browsing-related processes and functions; media processing instructions 866 to facilitate media processing-related processes and functions; location services instructions including GPS and/or navigation instructions 868 and Wi-Fi based location instructions to facilitate location based functionality; camera instructions 870 to facilitate camera-related processes and functions; and/or other software instructions 872 to facilitate other processes and functions, e.g., security processes and functions, and processes and functions related to the systems. The memory 850 may also store other software instructions such as web video instructions to facilitate web video-related processes and functions; and/or web shopping instructions to facilitate web shopping-related processes and functions. In some implementations, the media processing instructions 866 are divided into audio processing instructions and video processing instructions to facilitate audio processing-related processes and functions and video processing-related processes and functions, respectively. A mobile equipment identifier, such as an International Mobile Equipment Identity (IMEI) 874 or a similar hardware identifier can also be stored in memory 850.

Each of the above identified instructions and applications can correspond to a set of instructions for performing one or more functions described above. These instructions need not be implemented as separate software programs, procedures, or modules. The memory 850 can include additional instructions or fewer instructions. Furthermore, various functions may be implemented in hardware and/or in software, including in one or more signal processing and/or application specific integrated circuits.

Figure 9:
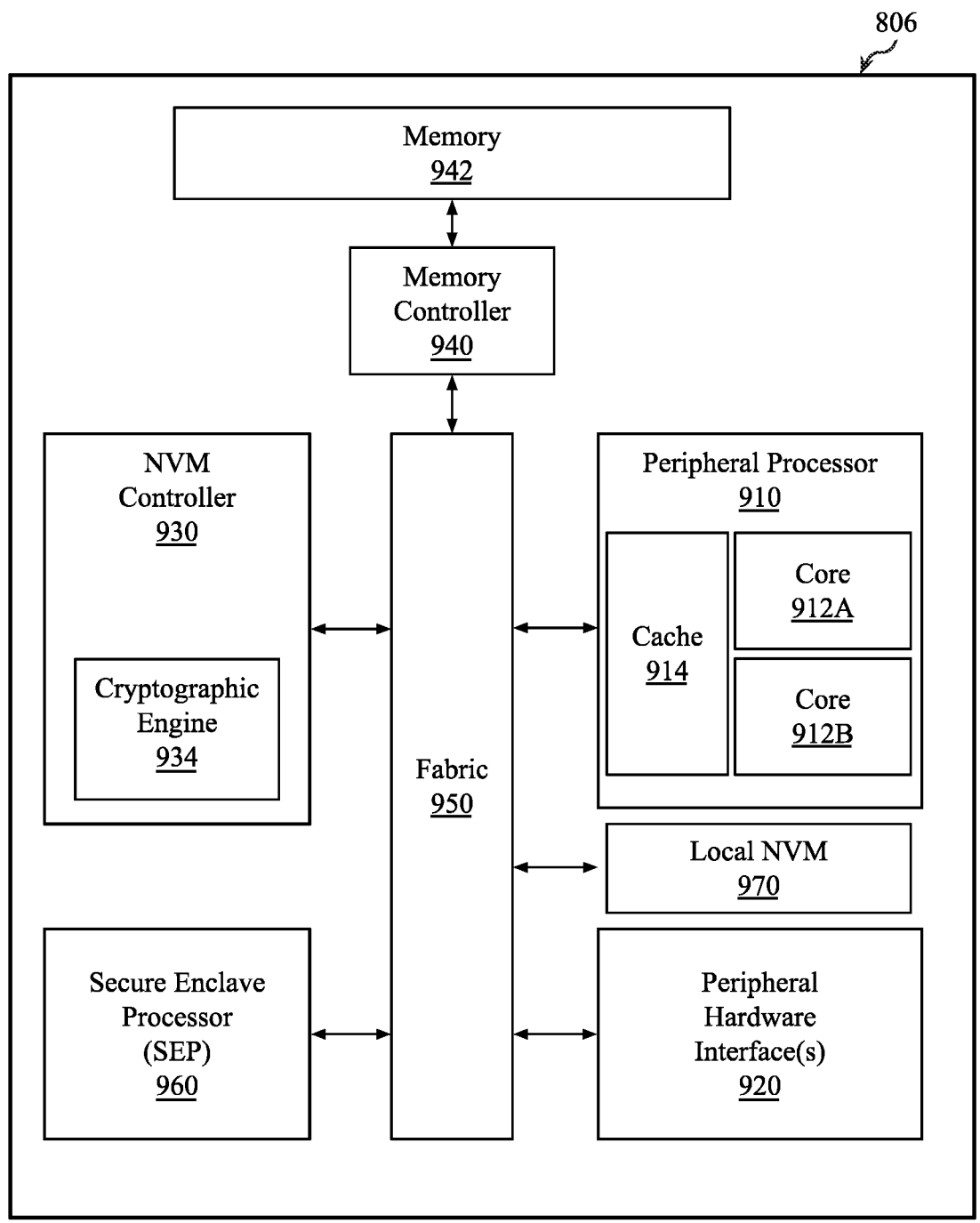
FIG. 9 is a block diagram of the peripheral processing system, according to an embodiment.

FIG. 9 is a block diagram of the peripheral processing system 806, according to an embodiment. In one embodiment the peripheral processing system 806 is a system on a chip integrated circuit that includes a peripheral processor 910 that facilitates an interface to the various system peripherals via one or more peripheral hardware interface(s) 920. In one embodiment the peripheral processing system 806 includes a crossbar fabric that enables communication within the system, although a system bus may also be used in other embodiments. The peripheral processing system 806 also includes a secure enclave processor (SEP) 960, which is a secure circuit configured to maintain user key bags for encrypting and decrypting data keys associated with a user. As used herein, the term "secure circuit" refers to a circuit that protects an isolated, internal resource from being directly accessed by any external circuits. The SEP 960 can be used to secure communication with the peripherals connected via the peripheral hardware interface(s) 920. The peripheral processing system 806 can also include a non-volatile memory controller 930 that controls access to data storage within a system, such as, for example, the non-volatile memory 805 of FIG. 8. The non-volatile memory controller 930 can include a cryptographic engine 934 to enable compressed data storage within the non-volatile memory. The cryptographic engine 934 can work in concert with the SEP 960 to enable high-speed and secure encryption and decryption of data stored in non-volatile memory.

In one embodiment the peripheral processor 910 includes multiple cores 912A-912B and at least one cache 914. The peripheral processor 910 can perform various peripheral node functions described herein. In one embodiment the peripheral processor 910 can securely boot a separate and complete operating system that is distinct from the operating system that executes via the host processing system (e.g., processing system 804). The peripheral processor 910 can facilitate the execution of VHCI firmware. In one embodiment the VHCI firmware can be loaded from local non-volatile memory 970 that is connected with the processor via the fabric 950. The VHCI firmware can be securely loaded into the memory 942 via a fabric-attached memory controller, enabling the peripheral processor 910 to perform peripheral node functionality for the peripherals attached via the peripheral hardware interface(s) 920.

Figure 10A:
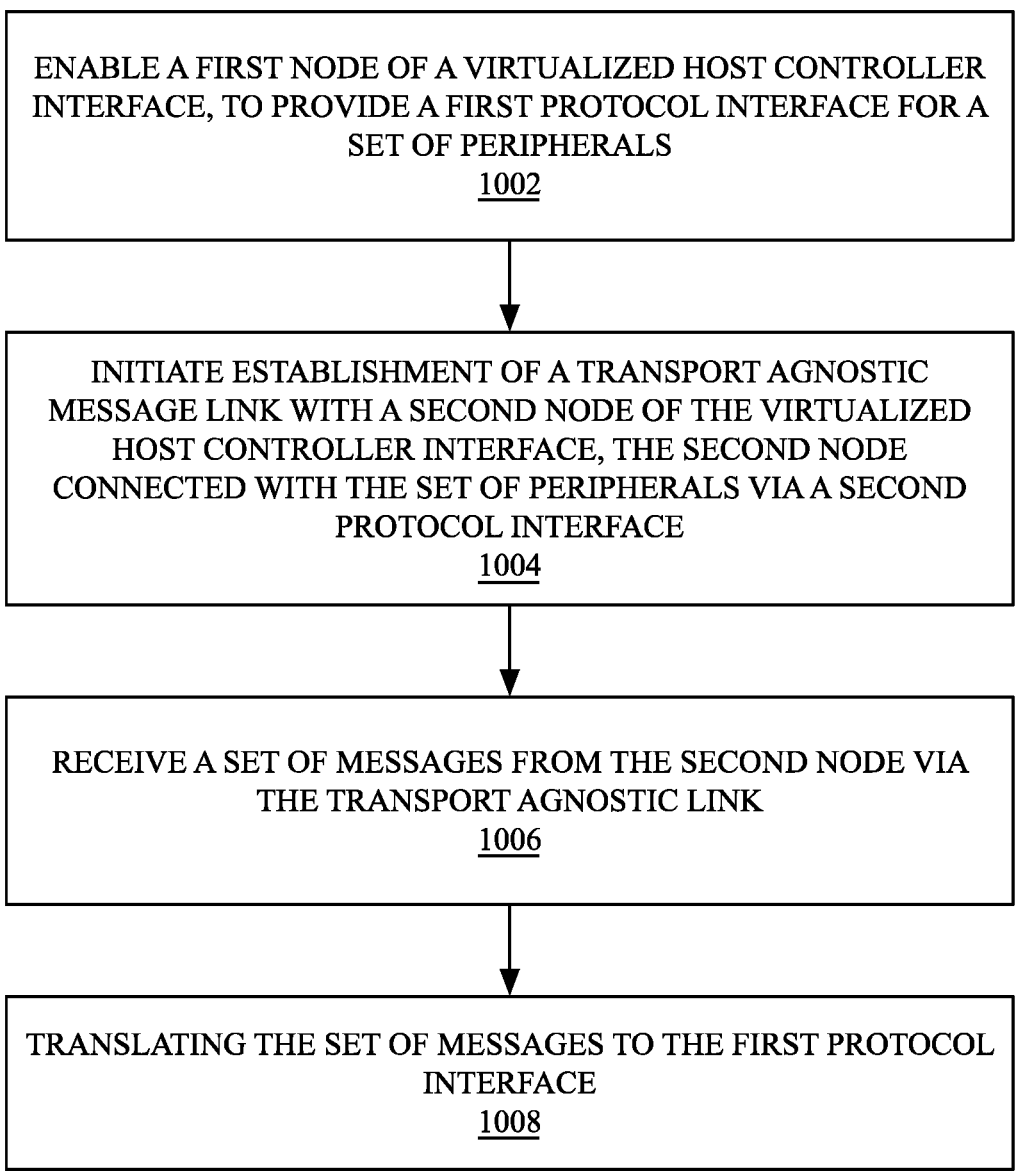
FIGS. 10A-10B illustrate flow diagrams of operations to enable a virtual host controller interface.
Figure 10B:
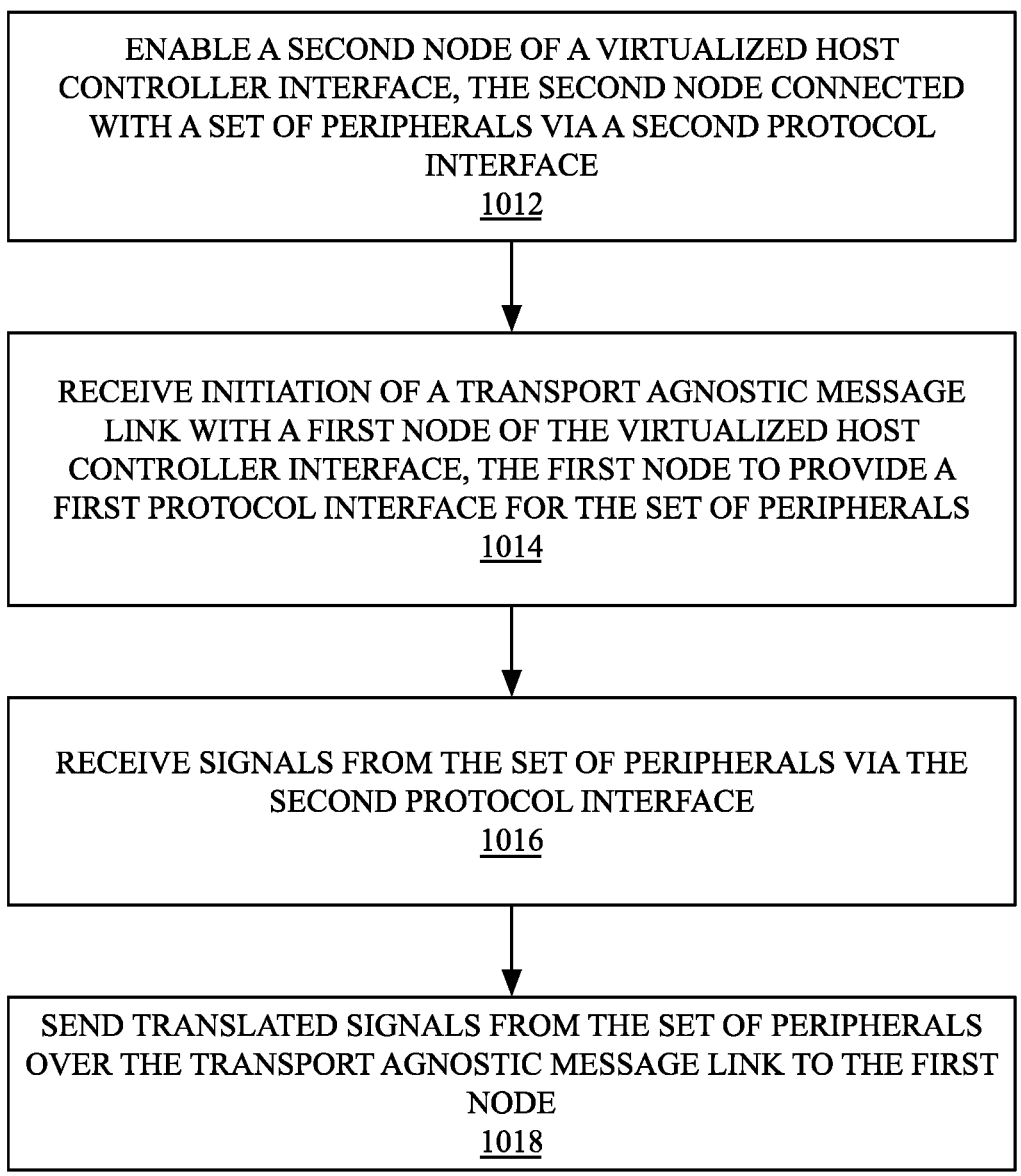

FIGS. 10A-10B illustrate flow diagrams of operations to enable a virtual host controller interface using a primary (e.g., master) node and a secondary (e.g., peripheral) node as described herein and as illustrated in FIGS. 3A-3B. FIG. 10A illustrates logic operations from the perspective of the master node. FIG. 10B illustrates logic operations from the perspective of the secondary node. The illustrated operations can be embodied within a non-transitory machine readable medium that stores instructions to perform the operations. In one embodiment the primary node can be enabled via a host driver executing on the system processor of a data processing system, while the secondary node can be implemented via firmware logic that executes via a secondary processor, such as the VHCI SOC 330 of FIG. 3A-3B or the peripheral processing system 806 as in FIG. 8-FIG. 9.

As illustrated in FIG. 10A, primary node logic 1000 can enable a first node of a virtualized host controller interface, as shown at block 1002. The first node provides a first protocol interface for a set of peripherals within the system. As shown at block 1004, the primary node logic 1000 can then initiate establishment of a transport agnostic message link with a second node of the virtualized host controller interface, where the second node connects with the set of peripherals via a second protocol interface as described herein. The primary node logic 1000 can then receive a set of messages from the second node via the transport agnostic link, as shown at block 1006, and translate the set of messages to the first protocol interface, as shown at block 1008.

As illustrated in FIG. 10B, secondary node logic 1010 can enable a second node of a virtualized host controller interface at block 1012. The second node can connect with a set of peripherals via a second protocol interface. The secondary node logic 1010 can then receive initiation of a transport agnostic message link with a first node of the virtualized host controller interface, as shown at block 1014. The first node can provide a first protocol interface for the set of peripherals. The secondary node logic 1010 can receive signals from the set of peripherals via the second protocol interface, as shown at block 1016. The secondary node logic 1010 can then send translated signals from the set of peripherals over the transport agnostic message link to the first node, as shown at block 1018.

In embodiments as generally described herein, the first protocol interface is the USB interface, which is used to facilitate the re-use of USB function drivers. However, the first protocol interface, in one embodiment, can be another commonly used data processing system interface.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense. The specifics in the descriptions and examples provided may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system according to embodiments and examples described herein. Additionally various components described herein can be a means for performing the operations or functions described in accordance with an embodiment.

Embodiments described herein provide hardware and software logic to present diverse peripherals on one node of a complex system as having a common interface and communication protocol when presented to peripheral drivers connected to another node. The nodes are connected using a transport agnostic mechanism that allows communication using one of a variety of different transport mechanisms, including but not limited to PCI/PCIe or Ethernet.

One embodiment provides for an apparatus comprising a first processor to execute a function driver for a peripheral having a first bus interface; and virtualized host controller interface logic to provide a protocol interface associated with the first bus interface to the function driver to enable the function driver to control a set of peripherals connected via at least a second bus interface, the second bus interface different from the first bus interface.

One embodiment provides for a data processing system comprising a first non-transitory machine-readable medium storing first instructions; a first processor configured to execute the first instructions, the first instructions to enable a first node of a host controller interface; a second non-transitory machine-readable medium storing second instructions; a second processor configured to execute the second instructions, the second instructions to enable a second node of the host controller interface; wherein the host controller interface is to provide a universal serial bus (USB) interface for a first non-USB peripheral via the first node; wherein the host controller interface is to connect with the first non-USB peripheral via the second node; and wherein the first node and the second node are to communicate via a transport agnostic link.

One embodiment provides for a non-transitory machine readable medium storing instructions which, when executed on one or more processors cause the one or more processors to perform operations comprising enabling a first node of a virtualized host controller interface, the first node providing a first protocol interface for a set of peripherals; initiating establishment of a transport agnostic message link with a second node of the virtualized host controller interface, the second node connected with the set of peripherals via a second protocol interface; receiving a set of messages from the second node via the transport agnostic link; and translating the set of messages to the first protocol interface.

One embodiment provides for a non-transitory machine readable medium storing instructions which, when executed on one or more processors cause the one or more processors to perform operations comprising enabling a second node of a virtualized host controller interface, the second node connected with a set of peripherals via a second protocol interface; receiving initiation of a transport agnostic message link with a first node of the virtualized host controller interface, the first node to provide a first protocol interface for the set of peripherals; receiving signals from the set of peripherals via the second protocol interface; and sending translated signals from the set of peripherals over the transport agnostic message link to the first node.

Other features of the present embodiments will be apparent from the accompanying drawings and from the detailed description above. Accordingly, the true scope of the embodiments will become apparent to the skilled practitioner upon a study of the drawings, specification, and following claims.

What is claimed is:

1. An apparatus comprising:
a first processor to execute a function driver for a peripheral having a first bus interface; and
virtualized host controller interface logic to provide a first protocol interface associated with the first bus interface to the function driver to enable the function driver to control a set of peripherals connected via at least a second bus interface, the second bus interface different from the first bus interface, wherein:
the virtualized host controller interface logic includes a first node and a second node, the first node to provide the first protocol interface to the function driver,
the second node is to connect to a first peripheral in the set of peripherals via the second bus interface and communicate with the first peripheral via a second protocol interface associated with the second bus interface, and
the first node and the second node are to communicate over a fourth bus via a transport agnostic protocol that is independent of the transport protocol of the fourth bus.

2. The apparatus as in claim 1, wherein the set of peripherals includes a biometric sensor.

3. The apparatus as in claim 2, wherein biometric sensor includes a fingerprint sensor.

4. The apparatus as in claim 2, wherein the set of peripherals includes a camera.

5. The apparatus as in claim 4, wherein the first bus interface is a universal serial bus (USB) interface.

6. The apparatus as in claim 5, wherein the second bus interface is a serial peripheral interface (SPI), a general-purpose input/output (GPIO) interface, an inter-integrated circuit (I2C) interface, or a Universal Asynchronous Receiver/Transmitter (UART) interface.

7. The apparatus as in claim 6, wherein the second node is to connect to a second peripheral in the set of peripherals via a third bus interface and the third bus interface is a serial peripheral interface (SPI), a general-purpose input/output (GPIO) interface, an inter-integrated circuit (I2C) interface, or a Universal Asynchronous Receiver/Transmitter (UART) interface, and the second node is to communicate with the second peripheral via a third protocol interface associated with the third bus interface.

8. The apparatus as in claim 7, wherein the fourth bus is a peripheral component interconnect (PCI) bus or a PCI express bus.

9. The apparatus as in claim 1, wherein the set of peripherals connected via at least the second bus interface includes a non-volatile storage device.

10. The apparatus as in claim 1, wherein the virtualized host controller interface logic includes a first node enabled via the first processor, the first node to provide the first protocol interface to the function driver and a second node to connect to the set of peripherals via at least the second bus interface, the second node enabled via a second processor.

11. The apparatus as in claim 10, wherein the first processor is to execute a first operating system and the second processor is to execute a second operating system different from the first operating system.

12. A data processing system comprising:
a first non-transitory machine-readable medium storing first instructions;
a first processor configured to execute the first instructions, the first instructions to enable a first node of a host controller interface;
a second non-transitory machine-readable medium storing second instructions;
a second processor configured to execute the second instructions, the second instructions to enable a second node of the host controller interface;
wherein the host controller interface is to provide a universal serial bus (USB) interface for a first non-USB peripheral via the first node;
wherein the host controller interface is to connect with the first non-USB peripheral via the second node; and
wherein the first node and the second node are to communicate via a transport agnostic link.

13. The data processing system as in claim 12, the second node to connect with the first non-USB peripheral via a first bus interface, the first bus interface including a serial peripheral interface (SPI), a general-purpose input/output (GPIO) interface, an inter-integrated circuit (I2C) interface, or a Universal Asynchronous Receiver/Transmitter (UART) interface.

14. The data processing system as in claim 13, the second node to connect with a second non-USB peripheral via a second bus interface, the second bus interface including a serial peripheral interface (SPI), a general-purpose input/output (GPIO) interface, an inter-integrated circuit (I2C) interface, or a Universal Asynchronous Receiver/Transmitter (UART) interface.

15. The data processing system as in claim 14, wherein the first bus interface differs from the second bus interface.

16. The data processing system as in claim 15, the second node to connect with a third non-USB peripheral via a third bus interface different from the first bus interface and the second bus interface.

17. The data processing system as in claim 16, wherein the first non-USB peripheral, second non-USB peripheral, or third non-USB peripheral includes a non-volatile storage device or a bio sensor.

18. The data processing system as in claim 16, the first node and the second node to communicate via the transport agnostic link over a fourth bus, the fourth bus having a transport protocol independent of the transport protocol of the transport agnostic link.

19. A non-transitory machine-readable medium storing instructions which, when executed on one or more processors cause the one or more processors to perform operations comprising:
enabling a first node of a virtualized host controller interface, the first node providing a first protocol interface for a set of peripherals;
initiating establishment of a transport agnostic message link with a second node of the virtualized host controller interface, the second node connected with the set of peripherals via a second protocol interface;
receiving a set of messages from the second node via the transport agnostic link; and
translating the set of messages to the first protocol interface.

20. The non-transitory machine-readable medium as in claim 19, the operations additionally comprising:

enabling the second node of a virtualized host controller interface, the second node connected with a set of peripherals via a second protocol interface;
receiving initiation of the transport agnostic message link with the first node of the virtualized host controller interface;
receiving signals from the set of peripherals via the second protocol interface; and
sending translated signals from the set of peripherals over the transport agnostic message link to the first node.

* * * * *